US010642090B2

(12) United States Patent
Umeda

(10) Patent No.: US 10,642,090 B2
(45) Date of Patent: May 5, 2020

(54) LIQUID CRYSTAL DISPLAY DEVICE

(71) Applicant: Mitsubishi Electric Corporation, Tokyo (JP)

(72) Inventor: Hiroshi Umeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/042,732

(22) Filed: Jul. 23, 2018

(65) Prior Publication Data

US 2019/0056619 A1    Feb. 21, 2019

(30) Foreign Application Priority Data

Aug. 17, 2017 (JP) ................................ 2017-157591
May 9, 2018 (JP) ................................ 2018-090631

(51) Int. Cl.
*G02F 1/1335*   (2006.01)
*G02F 1/1339*   (2006.01)

(52) U.S. Cl.
CPC .... *G02F 1/133512* (2013.01); *G02F 1/13394* (2013.01); *G02F 2001/13396* (2013.01)

(58) Field of Classification Search
CPC ................................................ G02F 1/133512
See application file for complete search history.

(56) References Cited

U.S. PATENT DOCUMENTS

| 6,292,237 B1 | 9/2001 | Hebiguchi |
| 2002/0075443 A1 | 6/2002 | Shimizu et al. |
| 2007/0024797 A1 | 2/2007 | Shimizu et al. |
| 2008/0259267 A1 | 10/2008 | Ashizawa et al. |
| 2008/0266511 A1 | 10/2008 | Shimizu et al. |
| 2009/0021675 A1* | 1/2009 | Kishioka ........... G02F 1/133555 349/106 |
| 2009/0073358 A1* | 3/2009 | Taguchi ............ G02F 1/133555 349/109 |
| 2013/0162928 A1 | 6/2013 | Ashizawa et al. |
| 2014/0063365 A1* | 3/2014 | Li ....................... G02F 1/13394 349/12 |
| 2015/0187293 A1 | 7/2015 | Yoo et al. |

(Continued)

FOREIGN PATENT DOCUMENTS

| JP | 2000-035589 A | 2/2000 |
| JP | 2002-182220 A | 6/2002 |

(Continued)

*Primary Examiner* — Edmond C Lau
(74) *Attorney, Agent, or Firm* — Studebaker & Brackett PC

(57) ABSTRACT

A liquid crystal display device according to the present invention includes an array substrate and a CF substrate. The CF substrate includes a lattice-shaped light shielding pattern between pixel electrodes and a columnar spacer at an intersection of the light shielding patterns. The array substrate and the CF substrate are disposed so as to face each other with a liquid crystal layer interposed therebetween. The intersection includes a portion in which signal lines intersect each other and a portion in which the signal lines do not intersect each other, whereby a step is provided on a surface of the array substrate. The columnar spacer includes a main spacer in the portion in which the signal lines intersect each other and a sub-spacer in the portion in which the signal lines do not intersect each other.

10 Claims, 12 Drawing Sheets

(56) References Cited

U.S. PATENT DOCUMENTS

| | | | | |
|---|---|---|---|---|
| 2015/0301399 A1* | 10/2015 | Tamaki | ............ | G02F 1/133504 |
| | | | | 349/96 |
| 2016/0370636 A1* | 12/2016 | Huang | ................ | G02F 1/13624 |
| 2018/0095317 A1* | 4/2018 | Song | ........................ | G06F 3/047 |
| 2018/0284516 A1* | 10/2018 | Kobayashi | ........ | G02F 1/133345 |

FOREIGN PATENT DOCUMENTS

| | | |
|---|---|---|
| JP | 2003-121857 A | 4/2003 |
| JP | 2005-128357 A | 5/2005 |
| JP | 2015-129907 A | 7/2015 |

* cited by examiner

F I G. 1
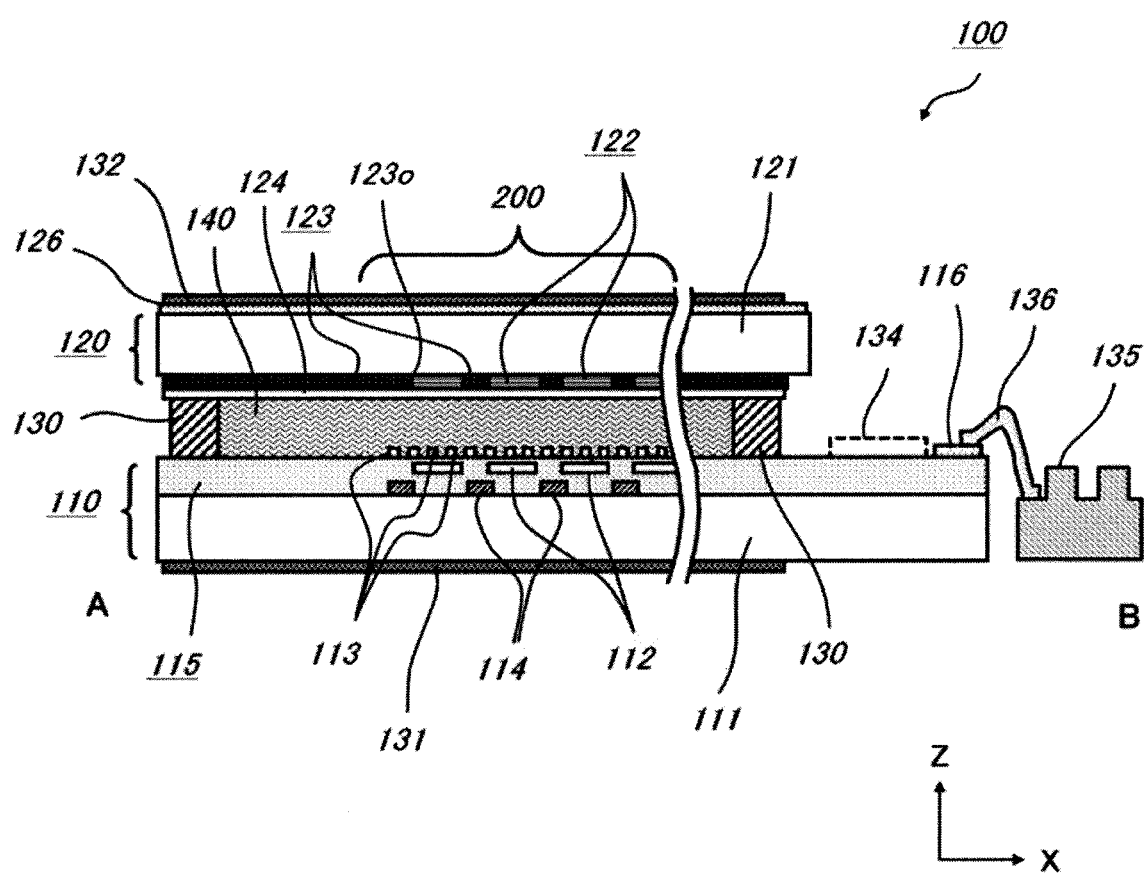

F I G. 3
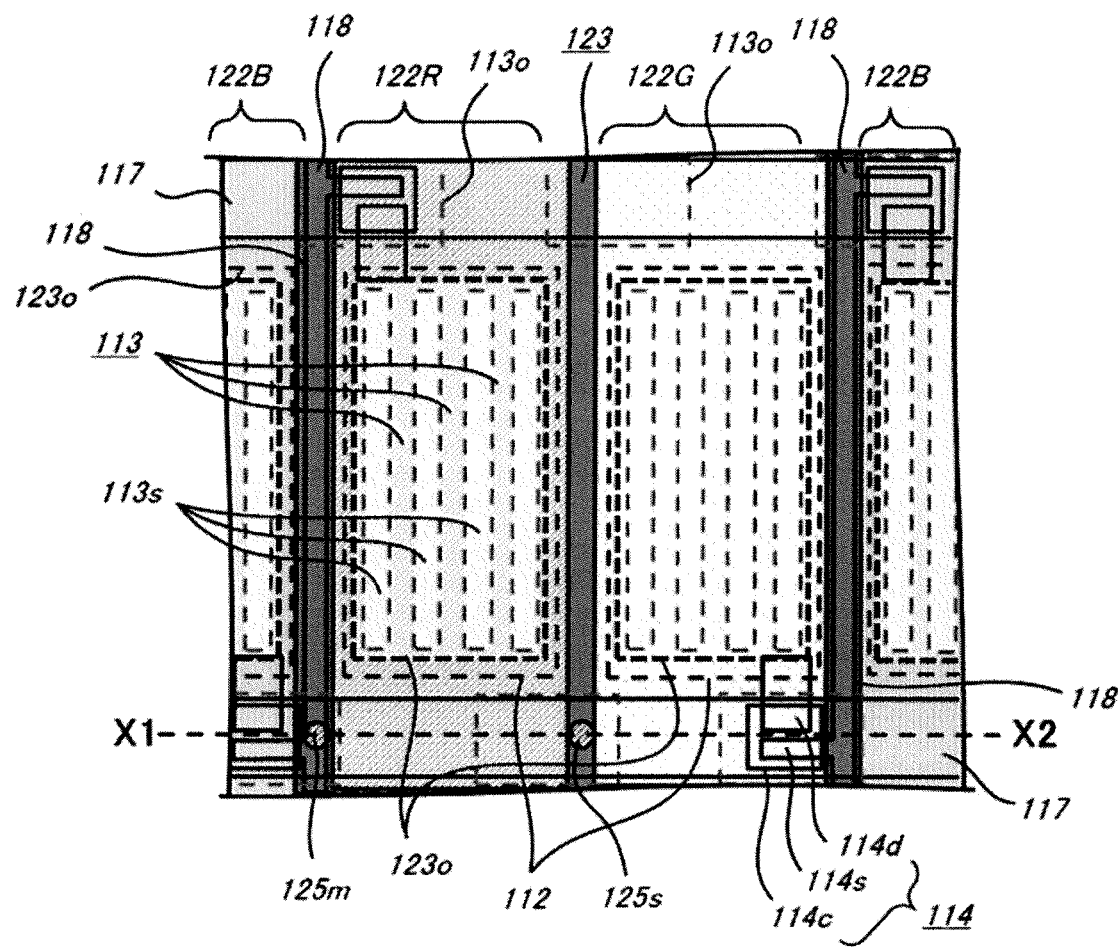

F I G. 1 2
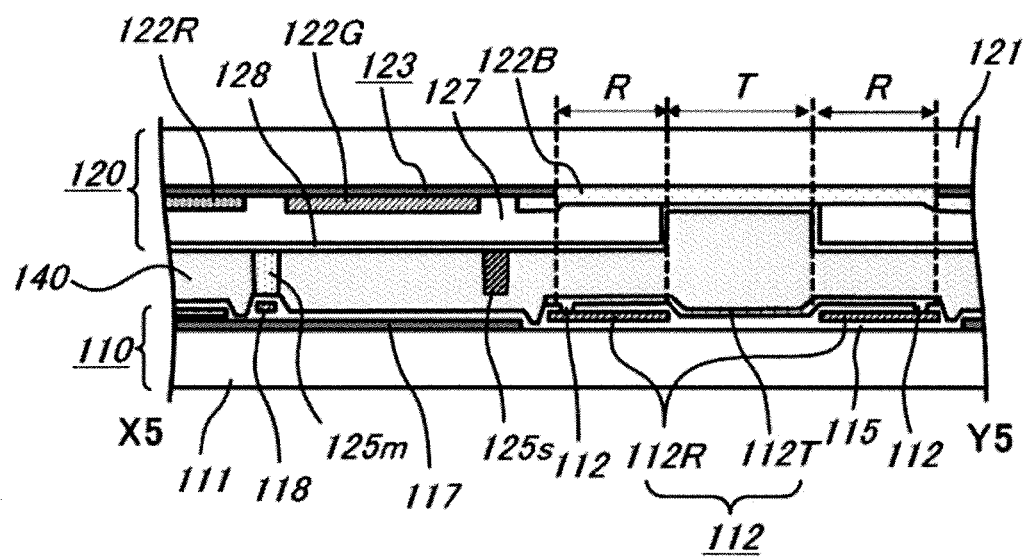

LIQUID CRYSTAL DISPLAY DEVICE

BACKGROUND OF THE INVENTION

Field of the Invention

The present invention relates to a liquid crystal display device, particularly to a liquid crystal display device including a columnar spacer that holds between substrates, decreasing the number of driving circuit chips, and saving manufacturing cost.

Description of the Background Art

As a technique of suppressing manufacturing cost by decreasing the number of driving circuit (IC) chips in a liquid crystal display device, for example, there is a technique called a double scanning line system that can decrease the number of video signal line-side driving IC chips that are a relatively expensive component.

For example, as disclosed in Japanese Patent Application Laid-Open No. 2000-35589 or 2015-129907, the liquid crystal display device of the double scanning line system is a liquid crystal display device in which pixels are arranged in a matrix form in a display region, two columns of pixels are disposed while one of video signal lines (source wirings) extending in a column direction is sandwiched therebetween, and the two columns of pixels share the one video signal line. Consequently, the number of video signal lines is halved, and the number of driving IC chips for the video signal lines can be decreased (also referred to as a half source system because the number of video signal lines can be halved). On the other hand, two adjacent pixels connected to one video signal line in each row through a switching element (for example, a thin film transistor (TFT)) are required to be driven by individual scanning signal lines (gate wirings). Consequently, two scanning signal lines are disposed for each of the regions between the two rows of pixels, and the number of scanning signal lines is doubled as compared with the conventional case. From this point, this system is called the double scanning line system.

One of features of the liquid crystal display device of the double scanning line system is that the number of video signal lines is halved, namely, the number of video signal lines is smaller than the number of pixels (the number of pixel columns) arranged in a row direction, so that an inter-pixel region where the video signal line is not provided is generated in a region between the two columns of pixels. Specifically, in the region between two columns of pixels, the inter-pixel region where one video signal line is disposed and the inter-pixel region where no video signal line is disposed (the video signal line is not provided) are alternately arranged. Depending on the application purpose, a system in which the number of video signal lines is doubled and the number of scanning signal lines is halved, whereby the number of driving IC chips for the scanning signal lines is decreased can be adopted contrary to the liquid crystal display device of the double scanning line system. However, this system also has the feature including the inter-pixel region where this video signal line is not provided.

In the liquid crystal display device of the double scanning line system, as disclosed in Japanese Patent Application Laid-Open No. 2015-129907, and a counter substrate (also referred to as a color filter substrate in the case where a color filter is provided) are provided opposite, via the liquid crystal layer, to an array substrate on which video signal lines and scanning signal lines having the features of the above-described double scanning line system are provided. In the counter substrate, a light shielding layer (black matrix (BM)) and a color filter, and the like are appropriately are provided. Additionally, a columnar spacer (post spacer (PS), also referred to as a column spacer) is disposed between the array substrate and the counter substrate in order to control the distance between the substrates, the distance corresponding to a thickness of the liquid crystal layer.

Because the liquid crystal which performs the display operation is basically excluded in the region where the columnar spacer is disposed, the display operation cannot be performed by turning on and off the liquid crystal. Additionally, desired alignment processing cannot be performed on an alignment film within a certain range near the columnar spacer to disorder the alignment of the liquid crystal, and the desired display operation cannot be performed by turning on and off the liquid crystal. Additionally, in the region where these columnar spacers are provided and the vicinity region, not only the display operation cannot be performed but also light leakage is generated. Consequently, it is necessary to dispose the columnar spacer in a light shielding region. Thus, the columnar spacer is basically disposed in the light shielding region where the light shielding layer (BM) is formed, namely, a region where at least the pixel electrode is not provided, for example, a region where a scanning signal wiring is provided, a region where a switching element (for example, the TFT) is provided, and a region where the video signal line is provided. In the configuration disclosed in the example of Japanese Patent Application Laid-Open No. 2015-129907, according to the above typical example, the columnar spacer CS is disposed near the region facing the TFT which is covered with an organic protective film PAC to planarize the surface in the light shielding region. In the example of Japanese Patent Application Laid-Open No. 2015-129907, the surface on the counter substrate (upper substrate SUBS1) side on which the columnar spacer CS is disposed is also planarized by a protective film OC.

On the other hand, in recent years, with widening the operating temperature range, for example, a dual spacer structure is frequently used in the liquid crystal display device as countermeasures against a defect (also referred to as a low-temperature bubble defect) that a bubble is generated in a cell because shrinkage of the columnar spacer cannot follow a shrinkage amount of the liquid crystal when the liquid crystal display device is placed at low temperatures or a defect (also referred to as high-temperature downward swelling or gravity unevenness) that a cell gap is increased in a lower portion of a panel in a gravity direction generated because expansion of the columnar spacer cannot follow an expansion amount of the liquid crystal when the liquid crystal display device is placed at high temperatures. The dual spacer structure includes columnar spacers (main spacers) that are provided always in contact with both the array substrate and the counter substrate to have a function of holding a substrate interval, and are disposed at relatively low density. In addition, the dual spacer structure includes columnar spacers (sub-spacers) that are provided in contact with one of the array substrate and the counter substrate at a normal time, and in the case where a large load is temporarily applied from the outside, come into contact with both the array substrate and the counter substrate to have a function of distributing and receiving the load. However, since the liquid crystal display device of the double scanning line system is a technology relating to a low-price liquid crystal display device which somewhat emphasizes low cost, there are few products in which the dual spacer structure guaranteeing quality in a wide operating temperature range is applied to the liquid crystal display device of the double scanning line system, and a literature specifically disclosing a configuration in which the dual spacer structure is applied to the liquid crystal display device of the double scanning line system is not confirmed.

An ordinary liquid crystal display device in which one video signal line and one scanning signal line are disposed in each inter-pixel region in the column direction or the row direction, namely, the configuration of the dual spacer structure in the ordinary liquid crystal display device in which the double scanning line system is not used is roughly divided into two types, for example, as described in Japanese Patent Application Laid-Open Nos. 2005-128357, 2002-182220, and 2003-121857.

First, one of the two types relates to the configuration of the dual spacer structure in which the columnar spacers provided on the counter substrate side have the same height, and using a step formed on the surface on the array substrate side, the columnar spacer disposed in the relatively projected portion is set to a main spacer while the columnar spacer disposed in a relatively recessed portion is set to a sub-spacer. As to a specific example of this configuration, for example, as disclosed in Japanese Patent Application Laid-Open No. 2005-128357, by separately providing, as the relatively projected portion, a base pattern in a part of the scanning signal line, the main spacer is disposed in the part, in which the base pattern is provided, of the scanning signal line, and the sub-spacer is provided in a part, in which the base pattern is not disposed, of the scanning signal line. As described in Japanese Patent Application Laid-Open No. 2002-182220, using the already-provided step formed on the surface of the array substrate side, for example, the main spacer is disposed in the relatively projected portion in the light shielding region such as a TFT portion and an intersection of the scanning signal line and the video signal line, and the sub-spacer is disposed in the relatively recessed portion in the light shielding region such as a part of the scanning signal line excluding the TFT portion and the intersection of the scanning signal line and the video signal line.

Second, for example, as described in Japanese Patent Application Laid-Open No. 2003-121857, the other of the two types relates to the configuration of the dual spacer structure in which the columnar spacers provided on the counter substrate side have two kinds of heights. In particular, in the case where the configuration in which the surface of the array substrate side is covered with an organic resin film (organic planarization film) having the function of planarizing the surface of the array substrate is used, because the step is not substantially formed on the surface of the array substrate side, the configuration utilizing the step on the surface of the array substrate side is hardly adopted, and the configuration in which the columnar spacers provided on the counter substrate side have two kinds of heights is frequently adopted.

However, in the two examples described in Japanese Patent Application Laid-Open Nos. 2005-128357 and 2002-182220 that are a typical arrangement in the former structure of the dual spacer structure, it is necessary to dispose the columnar spacers in a part of the scanning signal line excluding the TFT portion and the intersection of the scanning signal line and the video signal line. As described above, the alignment of the liquid crystal is disturbed in the vicinity of the columnar spacer, and therefore generation of light leakage is concerned. Consequently, it is necessary to provide a wider light shielding region compared with the light shielding region of the scanning signal line, which results in the degradation of the pixel aperture ratio. The region, generated in the vicinity of the columnar spacer, where the desired alignment processing is hardly performed to disturb the alignment of the liquid crystal, is widely formed on the downstream side in the alignment processing direction of the columnar spacer. For the transverse electric field system, the alignment processing is frequently performed in a direction parallel to a direction of a wiring. In such cases, when the columnar spacer is disposed in a part of the scanning signal line excluding the TFT portion and the intersection of the scanning signal line and the video signal line, a region where the alignment of the liquid crystal is disturbed is formed in a relatively large region outside the region where the scanning signal line is formed, which becomes the downstream side in the alignment processing direction. Thus, in particularly for the transverse electric field system, it is necessary to provide a wide light shielding region, which results in large degradation of the pixel aperture ratio. In a case where the region where the alignment of liquid crystal formed is disturbed in the vicinity of the columnar spacer is not used as the light shielding region, the light leakage of concern is generated, and therefore contrast of a display image is degraded, namely, which leads to degradation of display quality.

Additionally, there is a disadvantage that cost of the process of forming the counter substrate on which the columnar spacers are provided becomes high in the case where the dual spacer structure, as the latter structure of the dual spacer structure, in which the columnar spacers provided on the counter substrate side have two different heights is adopted.

As described above, problems such as the degradation of the pixel aperture ratio, the degradation of the contrast, and the high cost remain in the configuration of the dual spacer structure in the ordinary liquid crystal display device in which the double scanning line system is not used. As a matter of course, the cost reduction and the high quality in a wide operating temperature range are not compatible because the dual spacer structure using the double scanning line system is not disclosed in any one of Japanese Patent Application Laid-Open Nos. 2000-35589, 2015-129907, 2005-128357, 2002-182220, and 2003-121857. Additionally, the cost reduction and the high quality in a wide operating temperature range are not compatible with a high pixel aperture ratio and the high display quality because there is no description about a specific optimum structure in the dual spacer structure using the double scanning line system.

SUMMARY

An object of the present invention is to provide a liquid crystal display device having characteristics such as the low cost, the high quality in the wide operating temperature range, the high pixel aperture ratio, and the high display quality.

The liquid crystal display device of the present invention includes an array substrate and a counter substrate. A pixel electrode, a switching element, a plurality of scanning signal lines, and a plurality of video signal lines are provided in the array substrate. A plurality of pixel electrodes are arranged in a matrix form in a display region where an image is displayed. The switching element is connected to each of the pixel electrodes. The plurality of scanning signal lines and the plurality of video signal lines intersect each other, extend in a row direction or a column direction, and are connected to the switching element. The counter substrate is disposed opposite the array substrate with an interval while a liquid crystal layer is interposed between the counter substrate and the array substrate. A black matrix and a plurality of columnar spacers are provided on the counter substrate. The black matrix is constructed with a light shielding pattern. The light shielding pattern is provided into a lattice shape so as to overlap a region between the plurality of pixel electrodes arranged in the matrix form. The plurality of columnar spacers hold an interval between the counter substrate and the array substrate within a fixed range. Either one of the plurality of scanning signal lines and the plurality of video signal lines are arranged in a region between any two rows of pixel electrodes adjacent to each other. A region where one signal line of the other of the plurality of scanning signal lines and the plurality of video signal lines is disposed and a region where one signal line of the other of the plurality of scanning signal lines and the plurality of video signal lines is not disposed are mixed in a region between any two columns of pixel electrodes adjacent to each other. The intersection of the light shielding patterns provided in the lattice shape includes a portion in which the scanning signal line and the video signal line intersect each other and a portion in which the scanning signal line and the video signal line do not intersect each other. A step having a difference in height of a surface of the array substrate is provided between the portion in which the scanning signal line and the video signal line intersect each other and the portion in which the scanning signal line and the video signal line do not intersect each other. The columnar spacer is provided at an intersection of light shielding patterns provided into a lattice shape. The columnar spacer includes a main spacer and a sub-spacer. The main spacer is provided in the portion in which the scanning signal line and the video signal line intersect each other, and abuts on the surface of the array substrate. The sub-spacer is provided in the portion in which the scanning signal line and the video signal line do not intersect with each other. The sub-spacer does not abut on the surface of the array substrate in a normal state, but abuts on the surface of the array substrate when an interval is narrowed within a fixed range.

According to the liquid crystal display device of the present invention, the cost can be reduced, the generation of the defect when the liquid crystal display device is placed at low temperatures or high temperatures can be prevented, or the degradation of the aperture ratio or the contrast of the display image can be prevented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a sectional view illustrating a liquid crystal panel in a liquid crystal display device according to a first preferred embodiment of the present invention;

FIG. 3 is a plan view illustrating a main part of the liquid crystal panel in the liquid crystal display device of the first preferred embodiment of the present invention;

FIG. 12 is a sectional view illustrating the main part of the liquid crystal panel in the liquid crystal display device of the third preferred embodiment of the present invention.

DESCRIPTION OF THE PREFERRED EMBODIMENTS

First Preferred Embodiment

Figure 2:
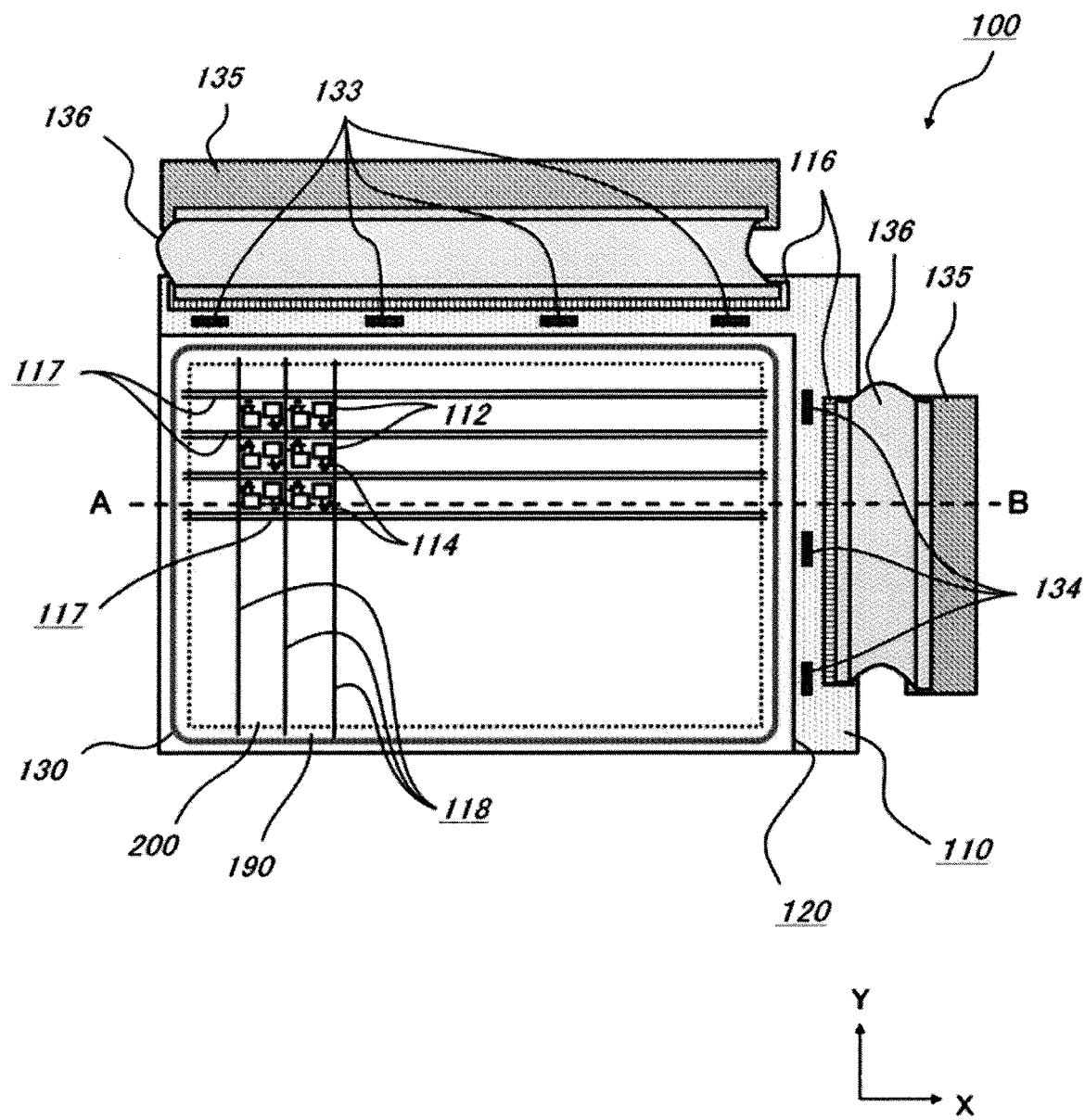
FIG. 2 is a plan view illustrating the liquid crystal panel in the liquid crystal display device of the first preferred embodiment of the present invention.
Figure 4:
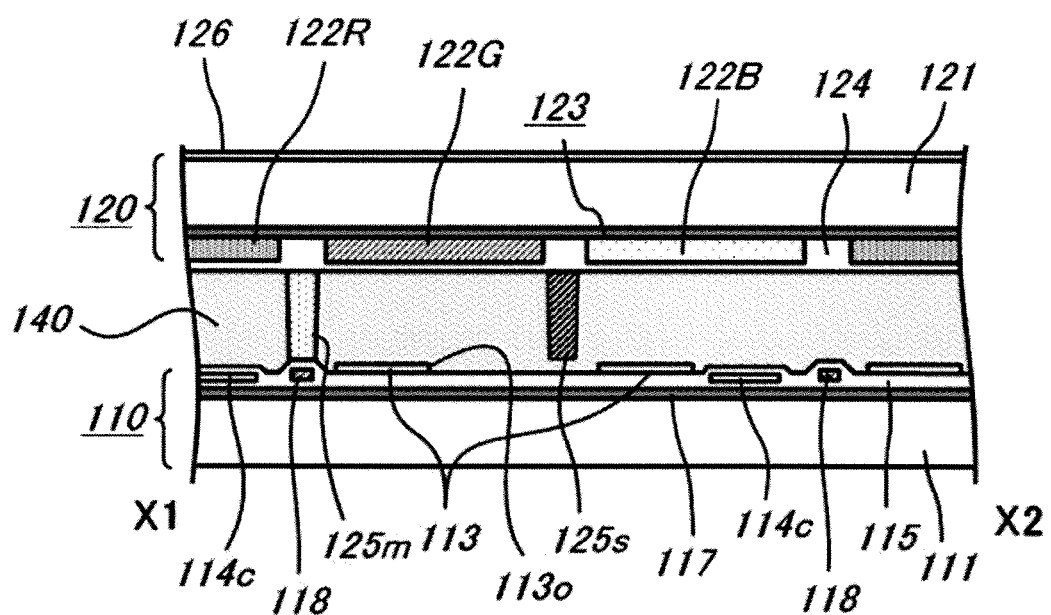
FIG. 4 is a sectional view illustrating the main part of the liquid crystal panel in the liquid crystal display device of the first preferred embodiment of the present invention.
Figure 5:
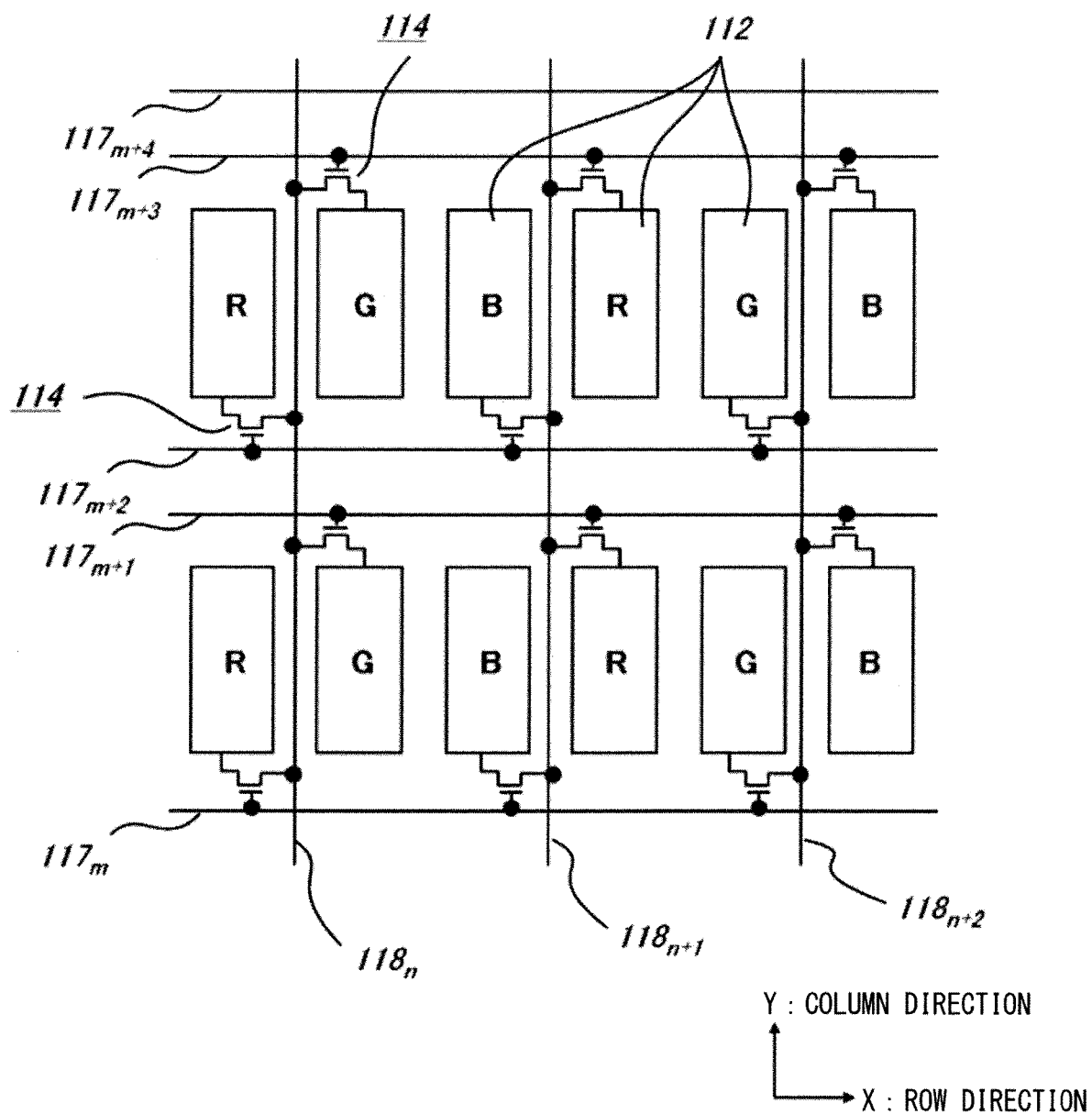
FIG. 5 is a schematic plan view illustrating an electrical connection relation of an array substrate in the liquid crystal display device of the first preferred embodiment of the present invention.

A configuration of a liquid crystal panel 100 used in a liquid crystal display device according to a first preferred embodiment will be described with reference to FIGS. 1 to 5. FIGS. 1 and 2 illustrate a sectional view and a plan view of the entire configuration of the liquid crystal panel, respectively, and FIG. 1 corresponds to a sectional view taken along line A-B in FIG. 2. FIGS. 3 and 4 are detailed explanatory views illustrating arrangement of each pattern such as a signal line provided on an array substrate that is of a main part of the present invention and disposition of a columnar spacer and a black matrix, which are provided on a color filter substrate 3, FIG. 3 is a plan view illustrating a planar arrangement of these components, and FIG. 4 corresponds to a sectional view taken along line X1-X2 in FIG. 3. FIG. 5 is a schematic plan view illustrating an electrical connection relation of the signal line and the like mainly provided on the array substrate.

Note that, the figures are schematically drawn, but do not reflect an exact size of the constituent in the figures or the like. In particular, for the components disposed between the color filter substrate and the array substrate, a distance between the color filter substrate and the array substrate, a length in the direction perpendicular to a substrate surface, and the like are exaggerated for convenience compared with thicknesses of the color filter substrate and the array substrate. In addition, in order to avoid complication of the drawings, omission of parts other than the main part of the present invention and simplification of a part of the configuration are performed as appropriate. The same holds true for the following drawings. Furthermore, in the following drawings, the same component as that described with reference to the previous drawing is designated by the same reference numeral as that used in the previous drawing, and the description thereof will be omitted as appropriate.

By way of example, a description will be given of the case where the present invention is applied to the transverse electric field system liquid crystal panel operated using a thin film transistor (TFT) as a switching element, particularly, a fringe field switching (FFS) system liquid crystal panel.

As illustrated in FIGS. 1 and 2, the liquid crystal panel 100 includes a TFT array substrate (hereinafter, referred to as an array substrate) 110, a color filter substrate (CF substrate) 120, and a sealing member 130. Switching elements such as TFTs and pixel electrodes are arrayed on the array substrate 110 in an array form. The CF substrate 120 that is a counter substrate including a display region 200 where an image is displayed, and the CF substrate is disposed opposite the array substrate 110. The sealing member 130 is disposed so as to surround a region corresponding to the display region 200, and the sealing member 130 seals a gap between the CF substrate 120 and the array substrate 110.

A liquid crystal layer 140 is sealed by the sealing member 130, and sandwiched at least in the region corresponding to the display region 200 in the gap between the CF substrate 120 and the array substrate 110. The sealing member 130 is formed in a frame region 190 disposed outside the region corresponding to the display region 200. Both the array substrate 110 and the CF substrate 120 have a rectangular outer shape. The outer shape of the array substrate 110 is larger than that of the CF substrate 120, and includes a protrusion that partially protrudes from an outer end face of the CF substrate 120. The array substrate 110 and the CF substrate 120 are disposed while overlapping each other. As illustrated in FIG. 2, the protrusions of the array substrate 110 are provided on two adjacent sides of the CF substrate 120, and the protrusions are provided on two adjacent sides of the array substrate 110.

In FIG. 2, a rectangular area constituting the display region 200 is surrounded by a dotted line, and is a boundary with the frame region 190. The frame region 190 as used herein means a frame-shaped region, which surrounds the display region 200 and is located outside the display region 200, that is, a whole region excluding the display region 200, in a region that is located on the array substrate 110 or CF substrate 120 of the liquid crystal panel 100 or sandwiched between the array substrate 110 and the CF substrate 120, and the display region 200 is also used for the whole region that is located on the array substrate 110 or CF substrate 120 of the liquid crystal panel 100 or sandwiched between the array substrate 110 and the CF substrate 120. In this specification, the frame region 190 and the display region 200 are used in the same meaning.

As illustrated in FIGS. 3 and 4, many columnar spacers (a main spacer 125$m$ and a sub-spacer 125$s$) that form and hold the gap, within a predetermined fixed range, between the array substrate 110 and the CF substrate 120 are disposed in the display region 200 (not illustrated in FIGS. 1 and 2). The columnar spacers (the main spacer 125$m$ and the sub-spacer 125$s$) which form and hold a gap within a predetermined fixed range between the substrates are characteristic configurations of the present invention, so that the columnar spacers will separately be described in detail.

A detailed configuration of the CF substrate 120 will be described below. Each component of the CF substrate 120 is disposed on a glass substrate 121 made of typical glass that is a transparent substrate having a thickness of about 0.7 mm. In at least the display region 200 on one surface of the glass substrate 121, the CF substrate 120 includes an alignment film (not illustrated), a color filter 122 (122R, 122G, and 122B are given as red (R), green (G), and blue (B) that are three primary colors, respectively), a black matrix (BM) 123, and an overcoat layer (OC layer) 124. The alignment film aligns liquid crystal. The color filter 122 is disposed below the alignment film. The BM 123 is a light shielding layer that is provided to shield gaps between the color filters 122R to 122B or the frame region 190 disposed outside the region corresponding to the display region 200. The OC layer 124 is provided below the alignment film and covers the surfaces of the color filters 122R to 122B and the BM 123, and is a planarization film constructed with a transparent resin film that planarizes the surface of the CF substrate 120 by planarizing a surface step formed between the color filters 122R to 122B and the BM 123.

For example, a color material layer in which a pigment, dye, or the like is dispersed in a photosensitive resin can be selected as the color filters 122R to 122B. The color filters 122R to 122B function as a filter selectively transmitting light in a specific wavelength range such as red, green, and blue, and patterns of the color material layers having different colors are regularly arrayed. For example, what is called a resin BM in which a carbon black pigment or a titanium black pigment is dispersed in a photosensitive resin may be used as the BM 123, or what is called a Cr-BM made of metallic Cr in which a Cr oxide film having a certain antireflection function is provided on the surface may be used as the BM 123. The BM 123 constructed with the resin BM is selected in the first preferred embodiment. As illustrated in the sectional view of FIG. 1 or the plan view of FIG. 3, a BM opening 123$o$ constituting an opening disposed corresponding to a pixel electrode 112 of each pixel is provided in the light shielding pattern provided particularly in the display region 200 of the BM 123, and constructed with a lattice-shaped light shielding pattern. That is, the lattice-shaped light shielding pattern of the BM 123 provided in the display region 200 is provided while overlapping the area between the pixel electrodes 112. The patterns of the respective color material layers of the color filters 122R to 122B described above are provided in a region covering at least the BM opening 123$o$ along a Y direction in FIG. 2.

Although not illustrated in the drawing, since the alignment film material to be the alignment film after the formation of the columnar spacer is applied to the alignment film formed on the surface of the CF substrate 120, the alignment film material is also applied to the surface of the columnar spacer, even though the alignment film is mainly formed in the region other than the portion, in which the columnar spacer is formed, in the display region 200. The alignment film material is formed relatively thin on the surface of the columnar spacer, but the alignment film material does not have a substantial function as an alignment film subjected to alignment processing on the surface of the columnar spacer.

Furthermore, the columnar spacers (the main spacer 125$m$ and the sub-spacer 125$s$) are provided between the array substrate 110 and the CF substrate 120, and provided while fixed to the surface on side of the CF substrate 120, particularly to the surface of the overcoat layer (OC layer) 124.

An antistatic transparent conductive layer 126 that is grounded is provided on the other surface of the glass substrate 121 of the CF substrate 120, that is, on the surface opposite to the surface on which the color filters 122R to 122B, the BM 123, and the like are provided. In the antistatic transparent conductive layer 126, a transparent conductive film such as an indium thin oxide (ITO) film is provided to cover at least the display region 200 of the glass substrate 121. The antistatic transparent conductive layer 126, and is effective in preventing a display defect due to charging of static electricity and external electric field in the transverse electric field system liquid crystal panel. On the other surface of the CF substrate 120, a polarizing plate 132 is provided outside the antistatic transparent conductive layer 126.

A detailed configuration of the array substrate 110 will be described below. Similarly to the CF substrate 120, each component of the array substrate 110 is disposed on a glass substrate 111 made of typical glass that is a transparent substrate having a thickness of about 0.7 mm. The description will be given in order from the components provided in the display region 200 of the array substrate 110. In the display region 200, the array substrate 110 includes an alignment film (not illustrated), a pixel electrode 112 and a counter electrode 113, a TFT 114, an insulating film 115, and a plurality of scanning signal lines (hereinafter, also referred to as gate wirings) 117 and a plurality of video signal lines (hereinafter, also referred to as source wirings) 118. The alignment film aligns the liquid crystal on one surface of the glass substrate 111. The pixel electrode 112 and the counter electrode 113 are provided below the alignment film, and the pixel electrode 112 and the counter electrode 113 are a pair of electrodes to which a voltage generating an electric field in a direction parallel to the substrate surface of the array substrate 110 or the CF substrate 120 to drive the liquid crystal is applied. The TFT 114 is a switching element that writes a voltage in the pixel electrode 112 which is one of the pair of electrodes. The insulating film 115 covers the TFT 114. The plurality of scanning signal lines 117 and the plurality of video signal line 118 are wirings through which signals are supplied to the TFT 114.

As illustrated in FIG. 3, the TFT 114 includes a semiconductor layer 114c that serves as an active layer of a transistor, a gate electrode (in this case, common to part of the gate wiring 117) of a transistor that is provided while overlapping the semiconductor layer 114c, a source electrode 114s, and a drain electrode 114d. The TFT 114 is electrically connected to the source wiring 118 through the source electrode 114s and to each pixel electrode 112 through the drain electrode 114d.

As to the pixel electrode 112 and the counter electrode 113 which are the pair of electrodes to which the voltage driving the liquid crystal is applied, in the first preferred embodiment, as illustrated in FIG. 3, the pixel electrode 112 which is one of the electrodes is constructed with a flat plate-shaped transparent conductive film pattern, and the counter electrode 113 which is the other electrode includes a slit electrode 113s constructed with a plurality of slit-shaped openings provided in parallel in a region overlapping the pixel electrode 112, and the counter electrode 113 is constructed with a transparent conductive pattern including a counter electrode (opening) 113o constituting the opening provided in the region overlapping the semiconductor layer 114c of the TFT 114, particularly in the formation region of the slit electrode 113s, the counter electrode 113 overlaps the pixel electrode 112 with the insulating film 115 interposed therebetween.

The above configuration of the pixel electrode 112 and the counter electrode 113 is optional, and a tooth electrode having a tooth shape may be used as both the pixel electrode 112 and the counter electrode 113, which are typically used as the electrode for the transverse electric field system in the conventional technique. Alternatively, as another mode of the FFS system, a vertical relationship of the shapes and disposition of the pixel electrode 112 and the counter electrode 113 are reversed, the pixel electrodes 112 is disposed above the counter electrode 113 as a pattern including a slit electrode constructed with a plurality of slit-shaped openings provided in parallel, the counter electrode 113 having the flat plate shape is disposed below the pixel electrode 112, and the TFT 114 may be connected to the pixel electrode 112 constructed with the pattern including the slit electrode to apply the voltage.

The insulating film 115 constituting the array substrate 110 is indicated as a simplified insulating film into which the insulating films insulating the semiconductor layer 114c, the gate electrode, the source electrode 114s, and the drain electrode 114d, which constitute the TFT 114, from one another, and the insulating film covering the TFT 114 or the insulating film formed between the pixel electrode 112 and the counter electrode 113 are integrated. However, between the electrodes, the insulating film 115 is constructed with a single-layer transparent insulating film or laminated film including a plurality of transparent insulating films.

As to the planar arrangement, a connection relation, and the like of the gate wiring 117, the source wiring 118, the TFT 114, the pixel electrode 112, and the counter electrode 113, which are provided on the array substrate 110, as illustrated in FIGS. 2, 3, and 5, the plurality of pixel electrodes 112 are arranged in a matrix form in the display region 200, and connected to the TFTs 114. A plurality of gate wirings 117 and a plurality of source wirings 118 are provided so as to extend in a row direction and a column direction, respectively. In the first preferred embodiment, assuming that the X direction illustrated in the drawings is the row direction and that the Y direction is the column direction, the gate wiring 117 extends in the row direction, and the source wiring 118 extends in the column direction. The plurality of gate wirings 117 and the plurality of source wirings 118 are provided so as to intersect each other.

In the first preferred embodiment, as illustrated in FIG. 3, the slit electrode 113s serving as the slit-shaped opening provided in the counter electrode 113 described above is provided while a longitudinal direction of the slit electrode 113s is set to the Y direction, namely, the column direction that is an extending direction of the source wiring 118. In the case where the pixel electrode 112 and the counter electrode 113 are tooth electrode having the tooth shape, similarly, the longitudinal direction of the tooth electrode may be set to in the column direction that is the extending direction of the source wiring 118. Even in the case where pixel electrodes 112 is formed by a pattern including the slit electrode constructed with the plurality of slit-shaped openings provided in parallel, which is another form of the pixel electrode 112 and the counter electrode 113, the longitudinal direction of the slit electrode provided on the side of the pixel electrode 112 may be set to the column direction that is the extending direction of the source wiring 118.

In a typical transverse electric field system liquid crystal panel, the slit electrode or the tooth electrode pattern constituting the pixel electrode 112 or the counter electrode 113 is frequently designed to be disposed line-symmetrically with two extending directions and to perform division alignment as a bent shape in one pixel or between two adjacent pixels. In the case where the division alignment setting is adopted in the first preferred embodiment, for example, the slit electrode or the tooth electrode pattern constituting the pixel electrode 112 or the counter electrode 113 may be formed into the bent shape having two longitudinal directions (extending methods) inclined in positive and negative directions at the same angle of 30 degrees or less with respect to the column direction that is the extending direction of the source wiring 118.

In the first preferred embodiment, what is called the double scanning line system is used as a method for supplying a display potential to the pixel electrode 112 through the gate wiring 117, the source wiring 118, and the TFT 114. For example, assuming that N pixel electrodes 112 arranged in a matrix form are arranged in the row direction (X direction) and that M pixel electrodes 112 are arranged in the column direction (Y direction), as illustrated in a schematic plan view of FIG. 5, the source wirings 118 ($118_n$ to $118_{n+2}$) are provided so as to divide the pixel electrodes 112 arranged in N columns into each two columns, and each source wiring 118 is connected to the pixel electrode 112 through the two TFTs 114 disposed on both sides of the pixel electrode 112. That is, in the source wirings 118 ($118_n$ to $118_{n+2}$), an inter-pixel region where one source wiring 118 is disposed and an inter-pixel region where the source wiring 118 is not disposed are alternately disposed in each region sandwiched between any two columns of pixel electrodes 112 adjacent to each other, so that a total of N/2 source wirings 118 are provided.

On the other hand, two gate wirings 117 ($117_m$ to $117_{m+4}$) are provided for each of the pixel electrodes 112 arranged in M rows so as to sandwich the pixel electrode 112 from both sides in the vertical direction, and the gate wirings 117 disposed sandwiching the TFTs 114 from both sides are alternately connected to the two TFTs 114 disposed on both sides of each of the N/2 source wirings 118. That is, two gate wirings 117 ($117_m$ to $117_{m+4}$) are provided in each region sandwiched between any two rows of pixel electrodes 112 adjacent to each other, and a total of 2M gate wirings 117 are provided.

As described above, the two TFTs 114 disposed on both sides of each source wiring 118 are connected to upper and lower gate wirings 117, so that the TFTs 114 are disposed at different positions on the upper and lower sides with respect to the pixel electrode 112 on both sides of each source wiring 118. FIG. 5 illustrates an example in which the TFTs 114 are disposed at different positions on the upper and lower sides with respect to the pixel electrode 112 in each column, that is, an example in which the two TFTs 114 disposed between the source wirings 118 are disposed at different positions on the upper and lower sides with respect to the pixel electrode 112. However, since the scanning signal voltage can be supplied to the two TFTs 114 disposed on both sides of each source wiring 118 through the different gate wirings 117, the two TFTs 114 disposed between the source wirings 118 may be disposed at the same position on the upper or lower side with respect to the pixel electrode 112, and alternately be disposed the upper and lower sides in units of two columns.

The configuration provided in the frame region 190 of the array substrate 110 will be described below. A signal terminal 116 that receives a signal supplied to the TFT 114 from the outside is provided on the surface of the frame region 190 on the array substrate 110, particularly on the surface on the side where the CF substrate 120 is provided in the protrusion that protrudes partially from the end face of the CF substrate 120. As illustrated in the drawing, the signal terminals 116 are provided in the frame region 190 of two sides of the array substrate 110 in correspondence with the protrusions provided on the two adjacent sides of the array substrate 110, one of the signal terminals 116 provided on the side in the Y direction in the drawings supplies a scanning signal to the gate wiring 117, and the other signal terminal 116 provided on the side in the X direction in the drawings supplies a video signal to the source wiring 118.

Although the signal terminal 116 is configured in an integrated manner in the drawings, in the detailed configuration, a plurality of rectangular pads separated corresponding to a plurality of signals are arrayed along the end of the substrate.

A control substrate 135 is connected to each pad of the signal terminal 116, the control substrate 135 being provided with, for example, a control integrated circuit (IC) chip that generates a control signal controlling the driving IC through a flexible flat cable (FFC) 136 constituting connection wiring. The control signal from the control substrate 135 is input to an input side of a source driving IC chip 133 for the source wiring 118 or the gate driving IC chip 134 for the gate wiring 117, which is attached to the protrusion, through the signal terminal 116, and an output signal output from an output side of the source driving IC chip 133 or the gate driving IC chip 134 is supplied to the TFT 114 in the display region 200 through many signal extraction wirings (not illustrated) drawn from the display region 200 and the gate wiring 117 or the source wiring 118.

In the first preferred embodiment, since the double scanning line system is used, and the number of source wirings 118 is decreased to a half of the number of columns of the pixel electrodes 112, so that the number of the source driving IC chips 133 for the source wirings 118 is also decreased.

The antistatic transparent conductive layer 126 formed on the surface of the CF substrate 120 is grounded. Although the detailed connection structure is not described with reference to the drawings, for example, a ground pad is provided on the protrusion of the array substrate 110, and the antistatic transparent conductive layer 126 and the ground pad are connected to each other by a conductive paste or a conductive tape. A silver paste that is a typical conductive paste agent can be used as the conductive paste. A base material, made of a metal foil such as an Al foil or a Cu foil, on which a conductive adhesive is applied, and a commercially available conductive tape can be used as the conductive tape.

The liquid crystal panel 100 of the first preferred embodiment is configured as described above. In the liquid crystal panel 100, a backlight unit (not illustrated) that is a light source is disposed opposite the substrate surface of the array substrate 110 through an optical sheet (not illustrated) having a function of adjusting light from the backlight unit on the opposite side to the display surface formed in the display region 200 of the CF substrate 120, and these members are accommodated in a casing (not illustrated) in which the display surface portion of the display region 200 is opened to form the liquid crystal display device of the first preferred embodiment.

With reference to a plan view of FIG. 3 and a sectional view of FIG. 4, a description will now be given of the arrangement of components such as the columnar spacers (the main spacer 125m and the sub-spacer 125s) provided on the CF substrate 120 and the BM 123, the columnar spacers being one of the characteristic configurations of the present invention, and particularly the positional relationship between the signal lines disposed on the side of the array substrate 110.

As to the planar arrangement of the BM 123 constructed with the lattice-shaped light shielding pattern of the first preferred embodiment, as illustrated in the plan view of FIG. 3, the inter-pixel region where one source wiring 118 is disposed and the inter-pixel region where the source wiring 118 is not disposed are alternately repeated in the inter-pixel regions in the column direction between the pixel electrodes 112. However, the light shielding patterns of the BM 123 are disposed in both the inter-pixel region where one source wiring 118 is disposed and the inter-pixel region where the source wiring 118 is not disposed. In particular, in the first preferred embodiment, the light shielding patterns of the BM 123 disposed in both the inter-pixel region where one source wiring 118 is disposed and the inter-pixel region where the source wiring 118 is not disposed are provided with the same width. That is, the light shielding patterns provided along the column direction in the BM 123 are provided with the same width between the columns.

When the image is displayed, generation of a vertical stripe and vertical unevenness along the column direction due to generation of luminance unevenness can be prevented by providing the light shielding patterns with the same width in this manner, and high display quality is desirably obtained. In the case where the design in which emphasis is placed on an aperture ratio rather than the display quality is performed, compared with the light shielding pattern of the BM 123 disposed in the inter-pixel region where one source wiring 118 is disposed, the light shielding pattern of the BM 123 disposed in the inter-pixel region where the source wiring 118 is not disposed may be provided so as to be thinned. In this case, the high aperture ratio can be obtained although the display quality is slightly inferior to that of equal width.

On the other hand, the two gate wirings 117 are provided in the inter-pixel region in the row direction between the pixel electrodes 112. In the inter-pixel region in the row direction between the pixel electrodes 112, as described above, the light shielding pattern of the BM 123 is disposed in the entire inter-pixel region in the row direction so as to cover the two gate wirings 117, which are provided adjacent and parallel to each other, including the gap between the two gate wirings 117.

The configuration of the columnar spacer of the first preferred embodiment will be described in detail below. As described above, the columnar spacers (the main spacer 125m and the sub-spacer 125s) of the first preferred embodiment are fixedly attached to the surface on the side of the CF substrate 120, so that a dual spacer structure in which two kinds of columnar spacers are provided in a mixed manner is used as the partial structure of the CF substrate 120 in order to prevent both a defect of swelling toward the bottom at high temperatures and a defect of poor foaming at low temperatures and to ensure resistance to external impact on the display surface.

More specifically, the sectional view of FIG. 4 illustrates the state in which an external pressure is not applied to the surfaces of the array substrate 110 and the CF substrate 120 of the liquid crystal panel 100, namely, the state in which a substrate interval is a predetermined value (cell gap value). However, in FIG. 4, the main spacer 125m abuts on both the array substrate 110 and the CF substrate 120. Although not illustrated, furthermore, the main spacer 125m abuts on the array substrate 110 and the CF substrate 120 even if the substrate interval becomes narrower than the predetermined value (cell gap value) by applying the external pressure and the like to the surfaces of the array substrate 110 and the CF substrate 120. That is, the main spacer 125m is provided while abutting on the CF substrate 120, and constantly abuts on the surface of the array substrate 110 to keep the substrate interval at the cell gap value, and therefore the main spacer 125m functions as the main spacer in the dual spacer structure.

On the other hand, the sub-spacer 125s abuts on the side of the CF substrate 120, but does not abut on the array substrate 110 as illustrated in FIG. 4, which shows the state in which the external pressure and the like is not applied.

Unlike the main spacer 125m, the sub-spacer 125s is not provided while always abutting on the surface of the array substrate 110. However, the sub-spacer 125s is elastically deformed when the array substrate 110 and the CF substrate 120 are brought close to each other within a deformable range of the main spacer 125m by applying external pressure and the like to the surfaces of the array substrate 110 and the CF substrate 120, and the sub-spacer 125s abuts on the array substrate 110 to maintain the substrate interval within a predetermined fixed range when the substrate interval becomes narrower than the above cell gap value. That is, the sub-spacer 125s does not abut on the surface of the array substrate 110 at a normal time. When the space between the array substrate 110 and the CF substrate 120 is narrowed within a predetermined fixed range to bring the array substrate 110 and the CF substrate 120 close to each other, and the sub-spacer 125s abuts on the surface of the array substrate 110 to maintain the substrate interval, thereby functioning as a sub-spacer in the dual spacer structure.

As to the planar arrangement of the main spacer 125m and the sub-spacer 125s, the main spacer 125m and the sub-spacer 125s are disposed at the intersection of the lattice-shaped light shielding patterns provided between the BM openings 123o in the BM 123 as illustrated in the plan view of FIG. 3. The intersection corresponds to the position of each lattice point in the lattice-shaped light shielding pattern. For the double scanning line system, the inter-pixel region where one source wiring 118 is disposed and the inter-pixel region where the source wiring 118 is not disposed are alternately disposed in each region sandwiched between any two columns of pixel electrodes 112 adjacent to each other, so that a portion in which the gate wirings 117 and the source wirings 118 intersect each other and a portion in which the gate wirings 117 and the source wirings 118 do not intersect each other, namely, a portion in which only the gate wiring 117 is provided are basically alternately provided along the row direction at the intersection of the lattice-shaped light shielding patterns in the BM 123.

Thus, at the intersection of the lattice-shaped light shielding patterns in the BM 123, a step due to the difference in the presence or absence of the source wiring 118 is formed on the array substrate 110. As long as a planarization layer that planarizes the step is provided above the source wiring 118, the steps having different heights on the surface of the array substrate 110 are provided in the portion in which the gate wiring 117 and the source wiring 118 intersect each other and the portion in which the gate wiring 117 and the source wiring 118 do not intersect each other at the intersection of the lattice-shaped light shielding pattern in the BM 123.

As described above, at the intersection of the lattice-shaped light shielding patterns in the BM 123 in which both the main spacer 125m and the sub-spacer 125s are disposed, the steps having different heights of the surface of the array substrate 110 are provided in the portion in which the gate wiring 117 and the source wiring 118 intersect each other and the portion in which the gate wiring 117 and the source wiring 118 do not intersect each other. In the first preferred embodiment, as illustrated in the plan view of FIG. 3, furthermore, the main spacer 125m is disposed at the intersection of the BM 123 in the portion in which the gate wiring 117 and the source wiring 118 intersect each other, and the sub-spacer 125s is disposed at the intersection of the BM 123 in the portion in which only the gate wiring 117 is disposed while the source wiring 118 is not provided. In FIG. 3, one main spacer 125m and one sub-spacer 125s are illustrated. However, in the display region 200, many main spacers 125*m* and many sub-spacers 125*s* are regularly arranged, and an arrangement rule and arrangement density of main spacers 125*m* and sub-spacers 125*s* may be set as appropriate. However, all the plurality of main spacers 125*m* are disposed at the intersections of the gate wirings 117 and the source wirings 118, and the plurality of sub-spacers 125*s* are disposed in the portions in each of which only the gate wiring 117 is disposed.

Although the main spacer 125*m* and the sub-spacer 125*s* of the first preferred embodiment function as the dual spacer structure as described above, the columnar resin pattern that is fixedly provided on the surface of the CF substrate 120 while provided with the same thickness is formed as a common member in the main spacer 125*m* and the sub-spacer 125*s* of the first preferred embodiment. Thus, the main spacer 125*m* and the sub-spacer 125*s* are provided at the same height on the surface of the CF substrate 120. In other words, the main spacer 125*m* and the sub-spacer 125*s* are provided at the same height from the substrate surface of the glass substrate 121. The reason why the structure on the CF substrate 120 functions as the dual spacer structure despite the fact that there is no difference between the main spacer 125*m* and the sub-spacer 125*s* is that the step is formed on the surface of the array substrate 110 on which the main spacer 125*m* and the sub-spacer 125*s* are disposed while facing each other.

As illustrated in the sectional view of FIG. 4, the step provided on the surface of the array substrate 110 provided to cause the main spacer 125*m* and the sub-spacer 125*s* to function as the dual spacer structure depends on the presence or absence of the source wiring 118 in the array substrate 110 in the portion facing the main spacer 125*m* and the sub-spacer 125*s*, and corresponds to the step due to the presence or absence of the source wiring 118 formed at the intersection of the BM 123 in the case of the use of the double scanning line system, as described above. As described above, the main spacer 125*m* and the sub-spacer 125*s* of the first preferred embodiment effectively functions as the columnar spacer having the dual spacer structure because of a relation between the characteristic arrangement of the gate wiring 117 and the source wiring 118 in the double scanning line system and the planar arrangement of the main spacer 125*m* and the sub-spacer 125*s*.

Figure 6:
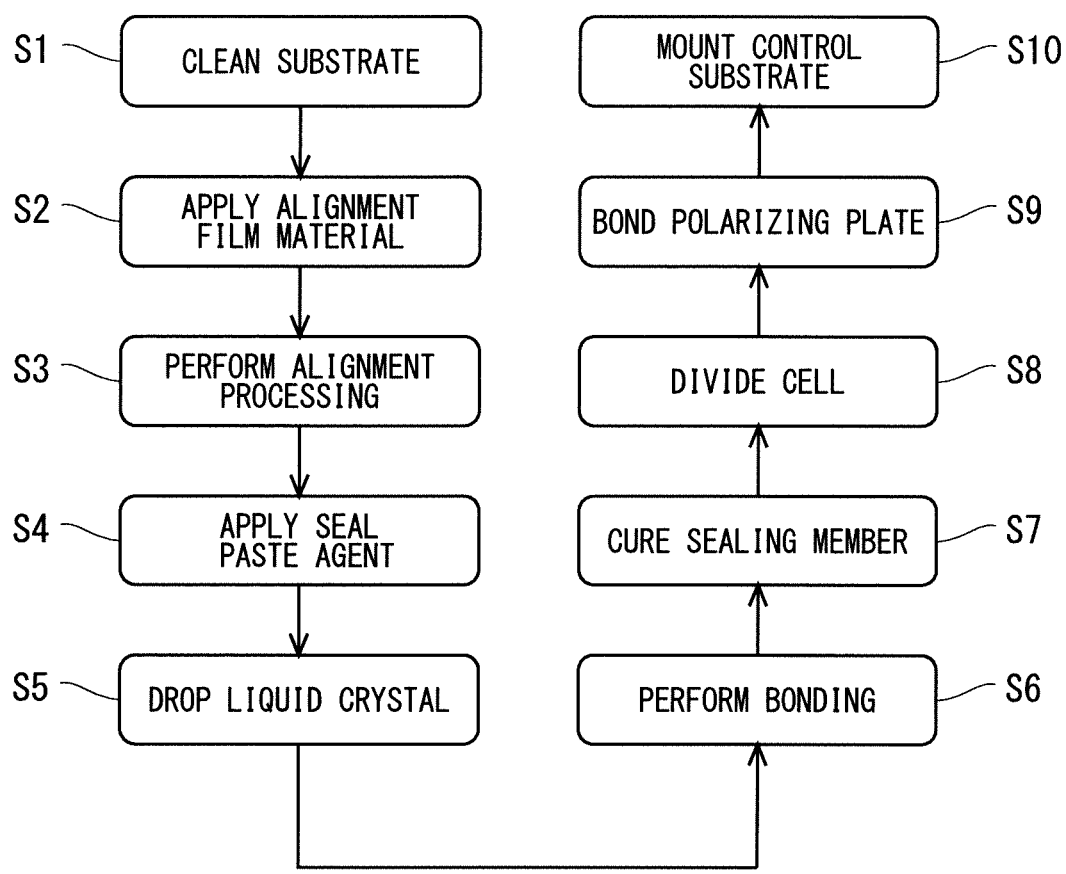
FIG. 6 is a flowchart illustrating a panel assembling step in a process of manufacturing the liquid crystal panel of the first preferred embodiment of the present invention.

An example of a method for manufacturing the liquid crystal display device of the first preferred embodiment will be described below. An outline of each step will be sequentially described with reference to the flowchart illustrated in FIG. 6 with respect to the process of manufacturing the characteristic liquid crystal panel of the present invention.

First, in a substrate preparation step, a mother array substrate from which the array substrate 110 is taken out and a mother CF substrate that is a mother substrate from which the CF substrate 120 is taken out are prepared before being bonded to each other. A predetermined number of array substrates 110 or CF substrates 120 having the same configuration are arranged and formed on each mother substrate. As described with reference to FIGS. 1 to 3, the mother array substrate having the configuration of the array substrate 110 and the mother CF substrate having the configuration of the CF substrate 120 can be manufactured by appropriately combining the known method for manufacturing the array substrate and the CF substrate of the FFS mode liquid crystal display device and a repetition of the known deposition step and patterning step when the detailed configuration of the array substrate 110 is understood. Thus, a more specific description of the method for manufacturing the mother array substrate and the mother CF substrate will be omitted.

In the first preferred embodiment, the columnar resin pattern provided with the same thickness is formed in the main spacer 125*m* and the sub-spacer 125*s* provided on the mother CF substrate. The columnar resin patterns having the same thickness can be formed according to a typical mother CF substrate manufacturing method, for example, by performing the patterning such that a photosensitive resin film is left at the formation positions of the main spacer 125*m* and the sub-spacer 125*s* by a common patterning step after the photosensitive resin film is applied and formed on the entire surface of the mother CF substrate.

In a later-described modification of the present invention, there is an example in which the columnar resin pattern constituting the columnar spacer is constructed with columnar resin patterns having different thicknesses. In this case, the columnar resin pattern can be formed using a halftone mask (also referred to as a gray tone mask, a halftone exposure mask, and a gradation exposure mask) technique which is a known method for forming the dual spacer structure having the different heights.

A substrate cleaning step of cleaning the substrate is performed on the mother array substrate on which the array substrate 110 prepared as described above is formed (S1). Subsequently, in an alignment film material coating step, an alignment film material is applied and formed on one surface of the mother array substrate (S2). In the alignment film material coating step, for example, the alignment film material made of an organic film is applied by a printing method, and baked and dried by a hot plate or the like. Subsequently, in an alignment processing step, alignment processing such as rubbing is performed on the alignment film material, and the surface of the alignment film material is aligned to form an alignment film on the side of the array substrate 110 (S3). As to direction of the alignment processing such as rubbing, the alignment processing is performed in the extending direction of the longitudinal direction of the slit electrode 113*s* or the direction substantially parallel to the column direction (the Y direction in the plan view of FIG. 2) that is the extending direction of the source wiring 118 agreeing with the extending direction of the slit electrode 113*s*. Similarly to S1 to S3, an alignment film on the side of the CF substrate 120 is also formed, on the mother CF substrate on which the CF substrate 120 is formed, by performing cleaning, the application of the alignment film material, and the alignment processing such as rubbing.

Subsequently, in a seal paste agent-applying step, a paste agent of an adhesive constituting the sealing member 130 is discharged from a dispenser nozzle and applied to one surface of the mother array substrate or the mother CF substrate using a seal dispenser device. The paste agent is applied in a pattern shape surrounding the display region 200 of the liquid crystal panel to form the sealing member 130 (S4). In a liquid crystal dropping step, a large number of droplet-shaped liquid crystals drop on one surface of the mother array substrate or the mother CF substrate in a region surrounded by the sealing member 130 (S5). Specifically, for example, with respect to the CF substrate 120 of the mother CF substrate, a large number of droplet-shaped liquid crystals drop in the region surrounded by the sealing member 130 such that a predetermined amount of the liquid crystal layer 140 is formed as a whole. The liquid crystal layer 140 is formed by the method for filling the region surrounded by the sealing member 130 with the liquid crystal using what is called a dropping injection method by way of example. In the case where what is called a vacuum injection method is used, the sealing member 130 is not a completely closed shape but a partially-opened liquid crystal injection port is formed. The processing of forming the above-described droplet-shaped liquid crystal is omitted because the liquid crystal is injected from the liquid crystal injection port after bonding.

Subsequently, in a bonding step, the mother array substrate and the mother CF substrate are bonded to form a cell substrate (S6). Specifically, the mother array substrate and the mother CF substrate are brought close to each other while the droplet-shaped liquid crystal is placed, and are aligned and overlapped. Consequently, the liquid crystal formed in the droplet shape is sandwiched between the mother array substrate and the mother CF substrate, and uniformly spread and integrated into the state of the liquid crystal layer 140, and the volume surrounded by the sealing members 130 between the mother array substrate and the mother CF substrate is filled with the liquid crystal.

In a sealing member curing step, the sealing member 130 is completely cured while the mother array substrate and the mother CF substrate are bonded (S7). The sealing member curing step is performed by, for example, applying heat according to a material of the sealing member 130 or irradiating the sealing member 130 with an ultraviolet ray. In the first preferred embodiment, the curing is performed by a method for irradiating the sealing member 130 with the ultraviolet ray that is compatible with the dropping injection method. Through the sealing member curing step, the mother array substrate and the mother CF substrate are fixed in the positional relationship after positioning.

In a cell dividing step, the cell substrate is divided into many individual cells (S8). For what is called a vacuum injection method, as described above, the partially-opened liquid crystal injection port is formed in the sealing member 130, and the liquid crystal is injected into the individual cell from the liquid crystal injection port in a liquid crystal injection step performed after the cell dividing step. In the liquid crystal injection step, for example, the liquid crystal layer 140 is formed by filling the cell with the liquid crystal from the liquid crystal injection port by vacuum injection. In a sealing step, furthermore, the liquid crystal injection port is sealed. The sealing step is performed by, for example, sealing the liquid crystal injection port using a light-curable resin and irradiating the liquid crystal injection port with the light.

After the cell substrate is divided into individual liquid crystal panels, the polarizing plate 131 and the polarizing plate 132 as optical films are bonded to the respective surfaces of the CF substrate 120 and the array substrate 110 of the individual cells in a polarizing plate bonding step (S9). Subsequently, the gate driving IC chip 134, the source driving IC chip 133, and the control substrate 135 are mounted in a control substrate mounting step (S10). In the control substrate mounting step, the FFC 136 to which the gate driving IC chip 134, the source driving IC chip 133, and the control substrate 135 are attached is bonded to the signal terminal 116 so as to be conductive to the signal terminal 116, and further the antistatic transparent conductive layer 126 on the surface of the CF substrate 120 and the ground pad formed on the surface of the array substrate 110 are conductive by applying or bonding the conductive member such as a conductive paste or a conductive tape from the CF substrate 120 to the array substrate 110. Through the above steps, the liquid crystal panel 100 is completed.

Finally, the backlight unit is disposed opposite the liquid crystal panel 100 with the optical sheet interposed therebetween, and the liquid crystal panel 100 is accommodated in the casing in which the outside of the CF substrate 120 in the display region 200 that is the display surface is opened, thereby the liquid crystal display device of the first preferred embodiment is completed.

The liquid crystal display device of the first preferred embodiment manufactured as described above operates as follows. For example, the control signal is input from the control substrate 135; the gate driving IC chip 134 and the source driving IC chip 133 operate; the video signal is input to the pixel electrode 112 disposed in each pixel region through the gate wiring 117, the source wiring 118, and the TFT 114 in the display region 200; a predetermined driving voltage is applied between the pixel electrode 112 and the counter electrode 113 that is disposed opposite the pixel electrode 112, the predetermined driving voltage generating an electric field (more specifically, in the FFS system, an electric field in which a component in the parallel direction is mainly generated because of coexistence of the electric field in the direction close to parallel to the electric field in the parallel direction) in a direction parallel to the substrate surface of the array substrate 110 or the CF substrate 120; and an orientation of a molecule of the liquid crystal changes in response to the driving voltage. The light emitted from the backlight unit is transmitted to or blocked by a viewer side through the array substrate 110, the liquid crystal layer 140, and the CF substrate 120, which allows an image to be displayed on the display surface formed in the display region 200 on the side of the CF substrate 120 of the liquid crystal panel 100.

The action and effects of the liquid crystal display device of the first preferred embodiment will be described below. In the liquid crystal display device of the first preferred embodiment, as described above, both the main spacer 125m and the sub-spacer 125s constituting the dual spacer structure are disposed at the intersections of the lattice-shaped light shielding patterns in the BM 123. On the other hand, in a vicinity of the columnar spacers, particularly on a downstream side with respect to the alignment processing direction of the columnar spacers, the alignment processing is insufficient, the alignment of the liquid crystal is disturbed, and an alignment defective region (hereinafter also referred to as a drag trace) where generation of light leakage is concerned due to the disturbed alignment of the liquid crystal is formed. On the other hand, because the liquid crystal display device of the first preferred embodiment is the transverse electric field system, the alignment processing direction is set substantially in parallel to the wiring direction. Specifically, the longitudinal direction of the slit electrode 113s provided in the counter electrode 113 is disposed in the column direction that is the extending direction of the source wiring 118, and the alignment processing is performed in the direction substantially parallel to the column direction. For the main spacer 125m and the sub-spacer 125s disposed at the intersection of the lattice-shaped light shielding pattern, although the drag trace is formed substantially along the extending direction of the source wiring 118 that is located on the downstream side from the intersection of the light shielding pattern in which these columnar spacers are disposed, the main spacer 125m and the sub-spacer 125s are formed along the light shielding region over lattice-shaped light shielding pattern (in particular, each light shielding pattern disposed while extending in the column direction that is the extending direction of the source wiring 118 in the BMs 123), so that the light leakage is not generated in the drag trace portion. In particular, in the lattice-shaped light shielding pattern of the BM 123 of the first preferred embodiment, the light shielding pattern is disposed in not only the inter-pixel region where the source wiring 118 is disposed, but also the inter-pixel region where the source wiring 118 is not disposed, so that the light leakage is not generated because the light of the drag trace generated near the sub-spacer 125s is shielded.

That is, the arrangement of the main spacer 125m and the sub-spacer 125s, the arrangement of the slit electrode in the transverse electric field system, and the arrangement of the lattice-shaped light shielding patterns in the BM 123 are adopted in the first preferred embodiment. Consequently, the light leakage due to the drag trace and degradation of contrast of the display image associated with the light leakage, namely, the degradation of the display quality can be prevented in the vicinities of the main spacer 125m and the sub-spacer 125s. The light leakage can be prevented without increasing the light shielding region in the BM 123 more than necessary, namely, without lowering the aperture ratio more than necessary, or the degradation of the display quality associated with the light leakage can be prevented. Improvement of the aperture ratio is particularly effective for pixel high definition.

In the liquid crystal display device of the first preferred embodiment, as described above, when the main spacer 125m and the sub-spacer 125s are disposed at the intersection of the lattice-shaped light shielding pattern in the BM 123, the configuration unique to the double scanning line system in which the step is formed on the surface of the array substrate 110 at the intersection of the lattice-shaped light shielding pattern in the BM 123 is used, as described above, in order that the main spacer 125m and the sub-spacer 125s function as the dual spacer structure. More specifically, on the surface of the array substrate 110 disposed opposite the main spacer 125m and the sub-spacer 125s that are disposed at the intersection of the lattice-shaped light shielding pattern in the BM 123, the step having the difference heights is provided, as the configuration unique to the double scanning line system, in the portion in which the gate wiring 117 and the source wiring 118 intersect each other and the portion in which the gate wiring 117 and the source wiring 118 do not intersect each other, thereby functioning as the dual spacer structure.

Except for some exceptional signal line arrangement such as the double scanning line system, in a typical liquid crystal display device, all the gate wirings and source wirings are disposed at the intersections of the lattice-shaped light shielding patterns in BM while intersecting each other, but the step is not formed on the surface of the array substrate unlike the first preferred embodiment. That is, the dual spacer structure in which the intersection of the lattice-shaped light shielding pattern and the step on the surface of the array substrate are used is not formed in the typical liquid crystal display device. Thus, in the case where dual spacer structure is formed in the typical liquid crystal display device, at least one of the main spacer and the sub-spacer is formed in the region other than the intersection of the lattice-shaped light shielding pattern, namely, at least one of the main spacer and the sub-spacer is disposed in a part of the region in which the intersection of the source wiring and the gate wiring or the TFT is excluded, or the configuration of the dual spacer structure in which the columnar spacers provided on the CF substrate side have two kinds of heights is adopted. As a result, the light leakage due to the drag trace and the degradation of the contrast of the display image associated with the light leakage are concerned. The light shielding region is increased to shield the light of the drag trace in order to prevent the light leakage and the degradation of the contrast, which leads to the degradation of the aperture ratio.

As described above, in the first preferred embodiment, since the dual spacer structure is formed using the step formed on the surface of the array substrate 110, the main spacer 125m and the sub-spacer 125s can be formed on the side of the CF substrate 120 with the columnar resin pattern having the same thickness as the common member. As a result, for the manufacturing process in forming the main spacer 125m and the sub-spacer 125s on the CF substrate 120, the manufacturing process, which occasionally leads to complication of the process or cost increase, is eliminated such as a halftone mask (or gray tone mask, other halftone exposure mask, gradation exposure mask) technique of providing the columnar resin pattern having different thicknesses on the side of the CF substrate, the halftone mask technique being another mode forming the dual spacer structure, and a method for performing the patterning step twice to form the different thicknesses. Thus, in the first preferred embodiment, the use of the manufacturing process that may be accompanied by complication of the process or the cost increase is eliminated in addition to the above effects, so that the generation of the defect when the liquid crystal display device is placed at low temperatures or high temperatures can be prevented relatively easily or at low cost, and the liquid crystal display device having the dual spacer structure which can obtain high reliability even if used in a wide temperature range can be obtained.

Figure 7:
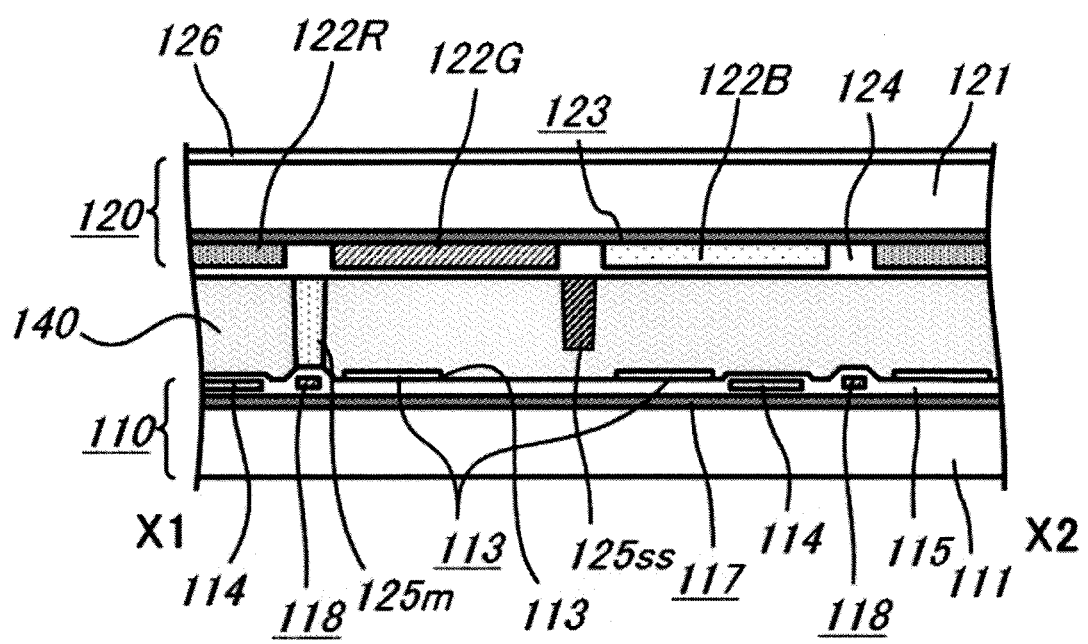
FIG. 7 is a sectional view illustrating a main part of a liquid crystal panel in a liquid crystal display device according to a modification of the first preferred embodiment of the present invention.

A modification of the first preferred embodiment will be described below with reference to FIG. 7. In the modification, unlike the first preferred embodiment, the columnar resin patterns having the same thickness are not provided as the common member particularly on the side of the CF substrate 120 constituting the columnar spacer of the dual spacer structure of the liquid crystal display device of the first preferred embodiment, but the columnar spacer of the dual spacer structure is constructed with the columnar resin patterns having different thicknesses. The description is focused on a portion changed from the first preferred embodiment, and the description of the overlapping configuration will be omitted as appropriate. FIG. 7 is a sectional view illustrating the columnar resin pattern provided on the side of the CF substrate 120 constituting the dual spacer structure that is the portion changed from the first preferred embodiment, and FIG. 7 corresponds to FIG. 4 that is the sectional view taken along line X1-X2 in FIG. 3 of the first preferred embodiment. Similarly to the sectional view of FIG. 4, FIG. 7 illustrates the state in which the external pressure and the like are not particularly applied to the surfaces of the array substrate 110 and the CF substrate 120 of the liquid crystal panel 100, namely, the state in which the substrate interval is the predetermined value (cell gap value).

In the modification, the positional relationship between the planar arrangement of the main spacer 125m and the sub-spacer 125s and each signal line disposed on the side of the array substrate 110 in FIG. 3 in the liquid crystal display device of the first preferred embodiment is not particularly changed. The columnar resin pattern provided particularly on the side of the CF substrate 120 constituting the columnar spacer of the dual spacer structure is constructed with the columnar resin pattern provided with different thicknesses as illustrated in FIG. 7, more specifically the modification includes a sub-spacer 125ss that is constructed with the columnar resin pattern provided thinner than the columnar resin pattern constituting the main spacer 125m.

On the other hand, as described above, because the positional relationship between the planar arrangement of the main spacer 125m and the sub-spacer 125s and each signal line disposed on the side of the array substrate 110 is the same as that of the first preferred embodiment, the modification has the same configuration as that of the first preferred embodiment in that on the surface of the array substrate 110 on which the main spacer 125m and the sub-spacers 125ss are disposed while facing each other, the step having different heights is also provided in the portion in which the gate wiring 117 and the source wiring 118 intersect each other and the portion in which the gate wiring 117 and the source wiring 118 do not intersect each other. Thus, as illustrated in FIG. 7, in the state in which the external pressure and the like are not particularly applied, the sub-spacer 125ss is disposed while spaced apart from the surface of the array substrate 110 by a distance corresponding to a sum of the thickness of the source wiring 118 and a difference between the thicknesses of the main spacer 125m and the sub-spacer 125ss. That is, the interval between the sub-spacer 125ss and the surface of the array substrate 110 in the state in which the external pressure and the like are not particularly applied is larger than the distance between the sub-spacer 125s and the surface of the array substrate 110 in the first preferred embodiment by the thickness difference between the main spacer 125m and the spacer 125ss.

In the liquid crystal display device, according to the modification of the first preferred embodiment, having the configuration as described above, the arrangement of the main spacer 125m and the sub-spacer 125ss, the arrangement of the slit electrode in the transverse electric field system, and the arrangement of the lattice-shaped light shielding pattern in the BM 123 are adopted similarly to the liquid crystal display device of the first preferred embodiment, so that the light leakage due to the drag trace and the degradation of the contrast of the display image associated with the light leakage, namely, the deterioration of the display quality in the vicinities of the main spacer 125m and the sub-spacer 125ss can be prevented. The light leakage can be prevented without increasing the light shielding region in the BM 123 more than necessary, namely, without lowering the aperture ratio more than necessary, or the degradation of the display quality associated with the light leakage can be prevented.

In addition to the step formed on the surface of the array substrate 110, the thickness difference between the main spacer 125m and the sub-spacer 125ss is used to increase the interval between the sub-spacer 125ss and the surface of the array substrate 110 in the dual spacer structure, and a margin of the compressive deformation amount of the main spacer 125m is increased until the sub-spacer 125ss and the array substrate 110 abut on each other. Thus, the liquid crystal display device having the dual spacer structure, which prevents the generation of the defect when the liquid crystal display device is placed at low temperatures or high temperatures and obtains the high reliability even if the liquid crystal display device is used in a wide temperature range, can be obtained similarly to the first preferred embodiment. Additionally, the margin of the compressive deformation amount of the main spacer 125m is increased until the sub-spacer 125ss and the array substrate 110 abut on each other increases, so that the effect that suppresses of the foaming failure at low temperatures can be enhanced to improve performance related to the reliability.

Second Preferred Embodiment

Figure 8:
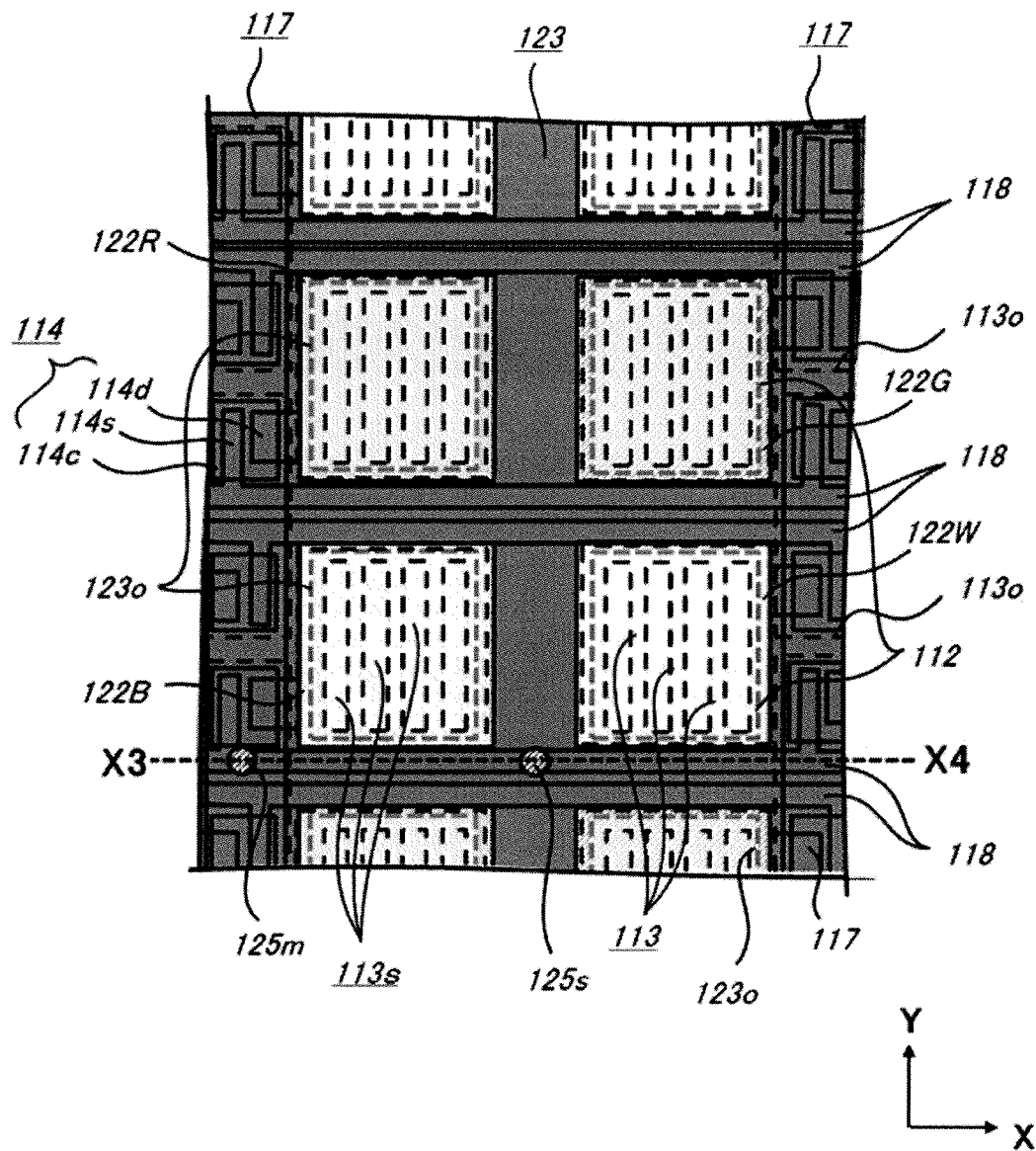
FIG. 8 is a plan view illustrating a main part of a liquid crystal panel in a liquid crystal display device according to a second preferred embodiment of the present invention.
Figure 9:
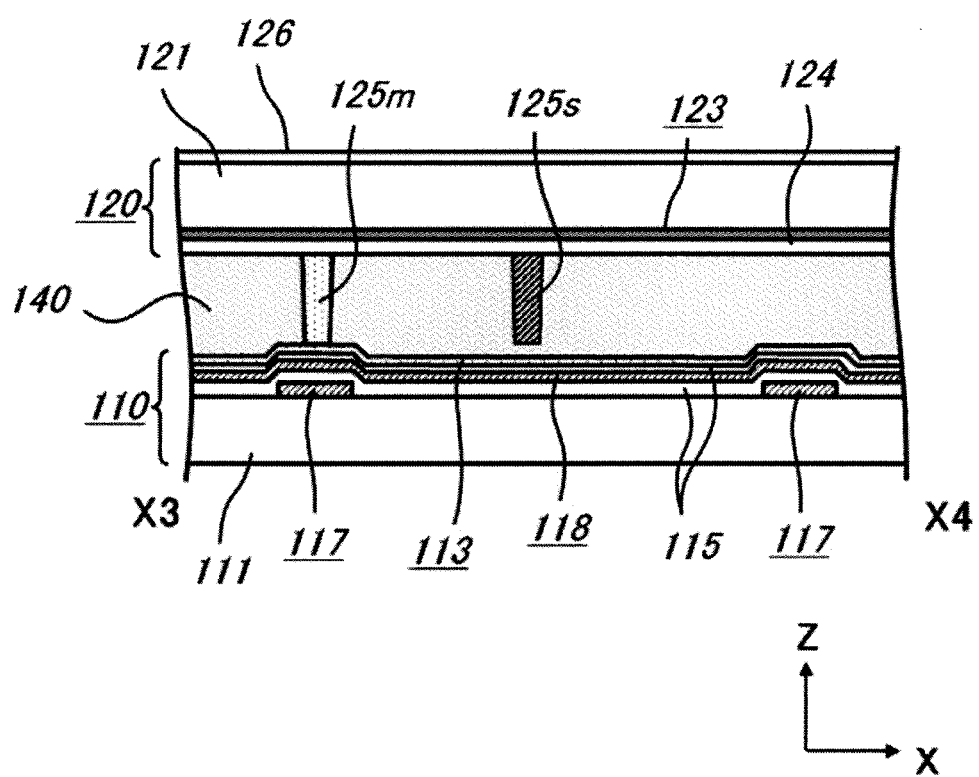
FIG. 9 is a sectional view illustrating the main part of the liquid crystal panel in the liquid crystal display device of the second preferred embodiment of the present invention.
Figure 10:
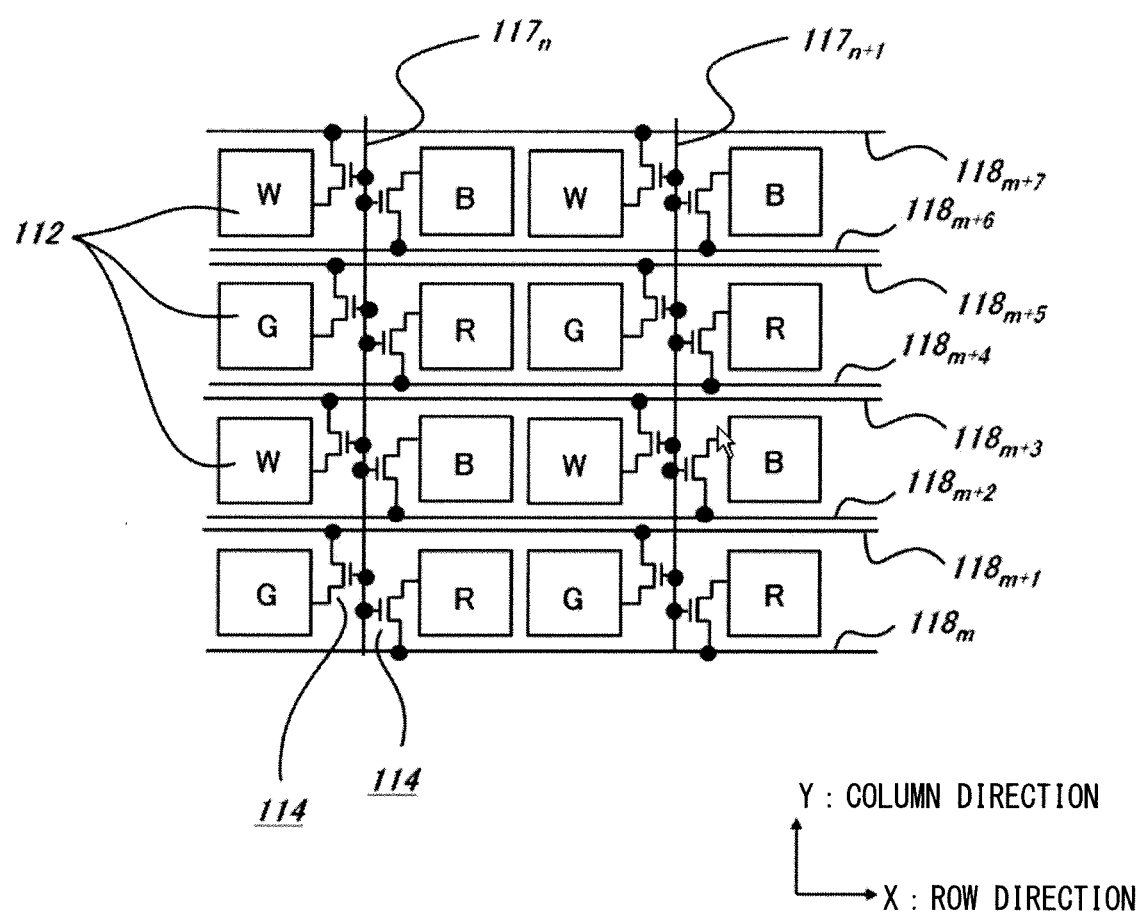
FIG. 10 is a schematic plan view showing an electrical connection relationship of an array substrate in the liquid crystal display device of the second preferred embodiment of the present invention.

A liquid crystal display device according to a second preferred embodiment, in which the arrangement of the signal line using the double scanning line system in the array substrate 110 is changed to the arrangement of the signal line using another system, from the liquid crystal display device of the first preferred embodiment described above, will be described with reference to FIGS. 8 to 10. FIGS. 8 and 9 are detailed explanatory views illustrating the arrangement of each pattern such as a signal line disposed on the array substrate which is a main part of the present invention and the arrangement of the columnar spacer and the black matrix provided on the color filter substrate, FIG. 8 is a plan view illustrating the planar arrangement of these components, and FIG. 9 corresponds to a sectional view taken along line X3-X4 in FIG. 8. FIG. 9 is a schematic plan view illustrating the electrical connection relationship of signal lines mainly provided on the array substrate. The portion changed from the first preferred embodiment will mainly be described below.

In the first preferred embodiment, what is called the double scanning line system is used as the method for supplying the display potential to the pixel electrode 112 through the gate wiring 117, the source wiring 118, and the TFT 114, and the main spacer 125m and the sub-spacer 125s are disposed in each of the portion in which the gate wiring 117 and the source wiring 118 intersect each other and the portion in which only the gate wiring 117 is provided without providing the source wiring 118 at the intersection of the BM 123 that is the characteristic arrangement of the gate wiring 117 and the source wiring 118 in the double scanning line system, whereby the dual spacer structure is formed using the step formed on the surface of the array substrate 110. On the other hand, in the second preferred embodiment, as the method for supplying the display potential to the pixel electrode 112 through the gate wiring 117, the source wiring 118, and the TFT 114, the relation between the row direction and the column direction of the gate wiring 117 and the source wiring 118 is reversed, the number of gate wirings 117 extending in the column direction is halved, the number of source wirings 118 extending in the row direction is doubled, and the main spacer 125m and the sub-spacer 125s are disposed in each of the portion in which the gate wiring 117 and the source wiring 118 intersect each other and the portion in which the source wiring 118 is disposed without providing the gate wiring 117 at the intersection of the BM 123.

More specifically, the detailed arrangement of the gate wiring 117 and the source wiring 118 provided on the array substrate 110 side will be described first. For example, assuming that N pixel electrodes 112 arranged in a matrix form are arranged in the row direction (X direction) and that M pixel electrodes 112 are arranged in the column direction (Y direction), as illustrated in the schematic plan view of FIG. 10, the gate wirings 117 ($117_n$ to $117_{n+1}$) are provided so as to divide the pixel electrodes 112 arranged in N rows into each two rows, and each gate wiring 117 is connected to the pixel electrode 112 through two TFTs 114 disposed on both sides of the gate wiring 117. That is, the inter-pixel region where one gate wiring 117 ($117_n$ to $117_{n+1}$) is disposed and the inter-pixel region where the gate wiring 117 is not disposed are alternately disposed in each region sandwiched between any two columns of pixel electrodes 112 adjacent to each other, so that a total of N/2 gate wirings 117 are provided.

On the other hand, two source wirings 118 ($118_m$ to $118_{m+7}$) are provided for each of the pixel electrodes 112 arranged in M rows so as to sandwich pixel electrode 112 from both sides in the vertical direction, and as illustrated in the plan view of FIG. 8, the two source wirings 118 are connected to the two TFTs 114 disposed side by side on each gate wiring 117 located in the region sandwiched by the two source wirings 118 that are disposed so as to sandwich each pixel electrode 112 from both sides in the vertical direction. That is, two source wirings 118 ($118_m$ to $118_{m+7}$) are provided in each region sandwiched between any two rows of pixel electrodes 112 adjacent to each other, and a total of 2M source wirings 118 ($118_m$ to $118_{m+7}$) are provided.

As described above, in the second preferred embodiment, the total of N/2 gate wirings 117 and the total of 2M source wirings 118 are provided for the pixel electrodes 112 arranged in M rows and N columns. Thus, although the configuration provided in the frame region 190 is not illustrated, the number of the gate driving IC chips 134 for the gate wiring 117 is decreased as the number of gate wirings 117 is decreased to a half number of columns of the pixel electrodes 112.

In the second preferred embodiment, in addition to the difference of the arrangement of the gate wiring 117 and the source wiring 118, the pixel electrode 112 and the counter electrode 113 have a substantially square shape, and in the pixel corresponding to a pair of pixel electrode 112 and the counter electrode 113, picture elements in each of which four pixels are set as repetitive units are arrayed to perform the color display, the four pixels including red (R), green (G), and blue (B) that are three primary colors and white (W) that mainly adjusts luminance, namely, four colors of blue, red, green, and white which are arranged in a matrix form of two rows and two columns.

In the first preferred embodiment, the slit electrode 113s serving as the slit-shaped opening provided in the counter electrode 113 is provided while the longitudinal direction of the slit electrode 113s is set to the Y direction, namely, the column direction that is the extending direction of the source wiring 118. On the other hand, in the second preferred embodiment, as illustrated in FIG. 8, although the same Y direction is used, the slit electrode 113s is provided while the longitudinal direction of the slit electrode 113s is set to the column direction that is the extending direction of the gate wiring 117.

The arrangement of each of the columnar spacers (the main spacer 125m and the sub-spacer 125s) and the BM 123 provided on the CF substrate 120 will be described in detail below while appropriately taking into account the positional relationship between the gate wiring 117 and the source wiring 118 provided on the side of the array substrate 110. As to the planar arrangement of the BM 123 constructed with the lattice-shaped light shielding pattern of the second preferred embodiment, as illustrated in the plan view of FIG. 8, the inter-pixel region where one gate wiring 117 is disposed and the inter-pixel region where the gate wiring 117 is not disposed are alternately repeated in the inter-pixel regions in the column direction between the pixel electrodes 112. However, the light shielding patterns of the BM 123 are disposed in both the inter-pixel region where one gate wiring 117 is disposed and the inter-pixel region where the gate wiring 117 is not disposed. In particular, in the first preferred embodiment, the light shielding patterns of the BM 123 disposed in both the inter-pixel region where one gate wiring 117 is disposed and the inter-pixel region where the gate wiring 117 is not disposed are provided with the same width. That is, the light shielding patterns provided along the column direction in the BM 123 are provided with the same width between the columns.

When the image is displayed, generation of a vertical stripe and vertical unevenness along the column direction due to generation of luminance unevenness can be prevented by providing the light shielding patterns with the same width in this manner, and high display quality is desirably obtained. In the case where the design in which emphasis is placed on an aperture ratio rather than the display quality is performed, compared with the light shielding pattern of the BM 123 disposed in the inter-pixel region where one gate wiring 117 is disposed, the light shielding pattern of the BM 123 disposed in the inter-pixel region where the gate wiring 117 is not disposed may be provided so as to be thinned. In this case, the high aperture ratio can be obtained although the display quality is slightly inferior to that of equal width.

On the other hand, the two source wirings 118 are provided in the inter-pixel region in the row direction between the pixel electrodes 112. In the inter-pixel region in the row direction between the pixel electrodes 112, as described above, the light shielding pattern of the BM 123 is disposed in the entire inter-pixel region in the row direction so as to cover the two source wirings 118, which are provided adjacent and parallel to each other, including the gap between the two source wirings 118.

In the second preferred embodiment, four pixels arranged in two rows and two columns are used as one picture element constructed with red (R), green (G), blue (B) and white (W) as described above, as illustrated in FIG. 8, color filters 122R to 122B are provided corresponding to red (R), green (G), and blue (R) by an isolated pattern of a color material layer provided in a region covering the BM opening 123o provided in the BM 123 and its peripheral portion, and a color filter 122W is provided corresponding to white (W) by an isolated pattern of a color material layer. As to the color filter 122W, as described above, the isolated pattern formed of a transparent color material layer made of a photosensitive resin in which dispersion of pigment or dye is omitted may be selected similarly to the color filters 122R to 122B. Alternatively, the overcoat layer (OC film) 124 made of a transparent resin film may also serve as the isolated pattern to eliminate the color filter 122W separately constructed with the isolated pattern.

The configuration of the columnar spacer of the second preferred embodiment will be described in detail below. Similarly to the first preferred embodiment, the dual spacer structure is used in the columnar spacer (the main spacer 125m and the sub-spacer 125s) of the second preferred embodiment, and the main spacer 125m abuts on the array substrate 110 and the CF substrate 120 while the sub-spacer 125s abuts on the CF substrate 120 side but does not abut on the array substrate 110 as illustrated in the sectional view of FIG. 9 in the state in which the external pressure and the like are not applied.

Furthermore, as to the planar arrangement of the main spacer 125m and the sub-spacer 125s, the main spacer 125m and the sub-spacer 125s are disposed at the intersection of the lattice-shaped light shielding patterns provided between the BM openings 123o in the BM 123 as illustrated in the plan view of FIG. 8. In the second preferred embodiment, the inter-pixel region where one gate wiring 117 is disposed and the inter-pixel region where the gate wiring 117 is not disposed are alternately disposed in each region sandwiched between any two columns of pixel electrodes 112 adjacent to each other, so that a portion in which the gate wirings 117 and the source wirings 118 intersect each other and a portion in which the gate wirings 117 and the source wirings 118 do not intersect each other, namely, a portion in which only the source wiring 118 is provided are basically alternately provided along the row direction at the intersection of the lattice-shaped light shielding patterns in the BM 123.

Thus, at the intersection of the lattice-shaped light shielding patterns in the BM 123, a step due to the difference in the presence or absence of the gate wiring 117 is formed on the array substrate 110. As long as a planarization layer that planarizes the step is provided above the gate wiring 117, the steps having different heights on the surface of the array substrate 110 are provided in the portion in which the gate wiring 117 and the source wiring 118 intersect each other and the portion in which the gate wiring 117 and the source wiring 118 do not intersect each other at the intersection of the lattice-shaped light shielding pattern in the BM 123.

In the main spacer 125m and the sub-spacer 125s of the second preferred embodiment, similarly to the first preferred embodiment, the columnar resin pattern that is fixedly attached to the surface of the CF substrate 120 while provided with the same thickness is formed as a common member. Similarly to the first preferred embodiment, furthermore, the main spacer 125m and the sub-spacer 125s function as the dual spacer structure by providing the step on the surface of the array substrate 110 in the portion facing the main spacer 125m and the sub-spacer 125s.

As described above, the main spacer 125m and the sub-spacer 125s of the second preferred embodiment effectively function as the columnar spacer having the dual spacer structure because of the relation between the characteristic arrangement of the gate wiring 117 and the source wiring 118 of the second preferred embodiment and the planar arrangement of the main spacer 125m and the sub-spacer 125s.

The action and effects of the liquid crystal display device of the second preferred embodiment will be described below. The liquid crystal display device of the second preferred embodiment is the transverse electric field system similarly to the first preferred embodiment, the longitudinal direction of the slit electrode 113s provided in the counter electrode 113 is disposed in the column direction that is the extending direction of the gate wiring 117, and the alignment processing is performed in the direction substantially parallel to the column direction. For the main spacer 125m and the sub-spacer 125s disposed at the intersection of the lattice-shaped light shielding pattern, although the drag trace that is generated on the downstream side in the alignment processing direction of the columnar spacer as described in the first preferred embodiment is formed along the extending direction of the gate wiring 117 that is located on the downstream side from the intersection of the light shielding pattern in which these columnar spacers are disposed, the main spacer 125m and the sub-spacer 125s are formed along the light shielding region over lattice-shaped light shielding pattern (in particular, each light shielding pattern disposed while extending in the column direction that is the extending direction of the gate wiring 117 in the BMs 123), so that the light leakage is not generated in the drag trace portion. In particular, in the lattice-shaped light shielding pattern of the BM 123 of the second preferred embodiment, the light shielding pattern is disposed in not only the inter-pixel region where the gate wiring 117 is disposed, but also the inter-pixel region where the gate wiring 117 is not disposed, so that the light leakage is not generated because the light of the drag trace generated near the sub-spacer 125s is shielded.

That is, the arrangement of the main spacer 125m and the sub-spacer 125s, the arrangement of the slit electrode in the transverse electric field system, and the arrangement of the lattice-shaped light shielding patterns in the BM 123 are adopted in the second preferred embodiment. Consequently, the light leakage due to the drag trace and degradation of contrast of the display image associated with the light leakage in the vicinities of the main spacer 125m and the sub-spacer 125s, namely, the degradation of the display quality can be prevented. The light leakage can be prevented without increasing the light shielding region in the BM 123 more than necessary, namely, without lowering the aperture ratio more than necessary, or the degradation of the display quality associated with the light leakage can be prevented.

As described above, in the second preferred embodiment, similarly to the first preferred embodiment, since the dual spacer structure is formed using the step formed on the surface of the array substrate 110, the main spacer 125m and the sub-spacer 125s can be formed on the side of the CF substrate 120 with the columnar resin pattern having the same thickness as the common member. As a result, the use of the manufacturing process that may be accompanied by the complication of the process or the cost increase is eliminated, so that the generation of the defect when the liquid crystal display device is placed at low temperatures or high temperatures can be prevented relatively easily or at low cost, and the liquid crystal display device having the dual spacer structure which can obtain high reliability even if used in a wide temperature range can be obtained.

In the liquid crystal display device of the second preferred embodiment, the color display is performed using red (R), green (G), and blue (B) that are the three primary colors and white (W) corresponding to the luminance signal, namely, four colors of blue, red, green and white, so that the high-quality image compatible with wide color reproducibility and high contrast can be displayed in addition to the above-described effects.

Third Preferred Embodiment

Figure 11:
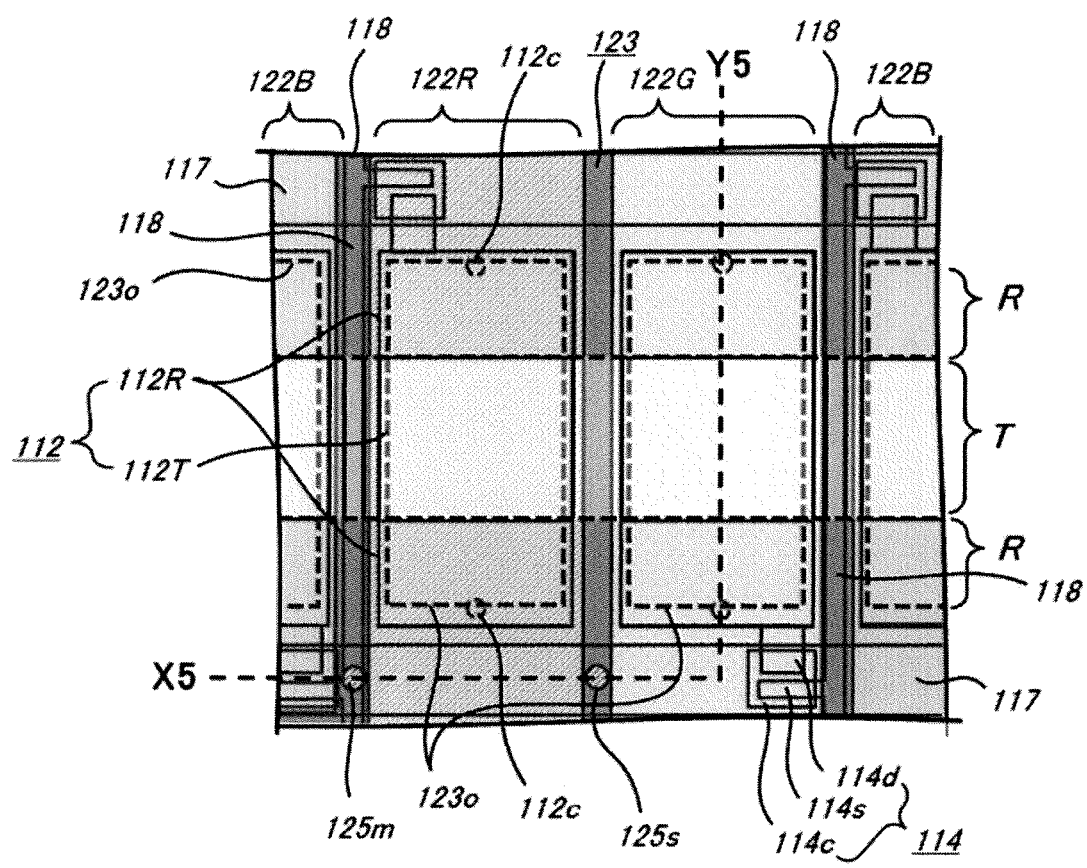
FIG. 11 is a plan view illustrating a main part of a liquid crystal panel in a liquid crystal display device according to a third preferred embodiment of the present invention.

A liquid crystal display device according to a third preferred embodiment that is an example in which the present invention is applied to a liquid crystal display device using a transflective double scanning line system will be described with reference to FIGS. 11 and 12. FIGS. 11 and 12 illustrate a sectional view and a plan view of the entire configuration of the liquid crystal panel, respectively, and FIG. 12 corresponds to a sectional view taken along line X5-Y5 in FIG. 11. The portion changed from the first preferred embodiment will mainly be described below.

The arrangement of each component provided on the side of the array substrate 110 of the third preferred embodiment will be described with reference to FIGS. 11 and 12. As illustrated in the plan view of FIG. 11, in the transflective liquid crystal display device of the third preferred embodiment, the third preferred embodiment differs from the first preferred embodiment in that the pixel electrode 112 includes a transmissive pixel electrode 112T constructed with a transparent conductive layer forming a transmission region T that transmits the light in a partial region of the pixel electrode 112 and the reflective pixel electrode 112R constructed with a metal reflective layer forming a reflective region R that reflects the light in the other partial region of the pixel electrode 112. Any type of the transmissive pixel electrode 112T and the reflective pixel electrode 112R used in a known transflective liquid crystal display device can be applied as the specific configurations of the transmissive pixel electrode 112T and the reflective pixel electrode 112R.

In the pixel electrode 112 of the third preferred embodiment, by way of example, as the transmissive pixel electrode 112T provided in the transmission region T, the pixel electrode 112 is constructed with a single layer of a typical transparent conductive film such as an ITO film. For example, as the reflective pixel electrode 112R provided in the reflective region R, a single layer film in which at least an Al film that is a typical reflective electrode film is provided in a surface layer or a multilayer film in which a contact layer such as a Mo film is provided in a lower layer is selected. Further, as illustrated in the sectional view of FIG. 12, also in the reflective region R, the transmissive pixel electrode 112T is disposed above the reflective pixel electrode 112R in the reflective region R so as to overlap the reflective pixel electrode 112R, and the transmissive pixel electrode 112T and the reflective pixel electrode 112R are electrically connected to each other through a contact hole 112c that is formed to pass through the insulating film 115 disposed between the transmissive pixel electrode 112T and the reflective pixel electrode 112R. As illustrated in FIGS. 11 and 12, one pixel is divided into three regions, namely, upper, middle, lower, and in three regions, the middle region is set to the transmission region T, and the remaining regions are set to the reflective region R.

As described above, the transflective liquid crystal display device of the third preferred embodiment is largely different from the transverse electric field system liquid crystal display device of the first preferred embodiment in the configuration of the pixel electrode 112. However, the transflective liquid crystal display device of the third preferred embodiment is identical to the transverse electric field system liquid crystal display device of the first preferred embodiment in that the double scanning line system is used in the configuration of the TFT 114 connected to the pixel electrode 112 including the transmissive pixel electrode 112T and the reflective pixel electrode 112R and the connection structure and planar arrangement of the gate wiring 117 and source wiring 118 connected to the TFT 114, so that there is little difference as illustrated in the plan view of FIG. 11.

More particularly, assuming that the X direction in FIG. 11 is the row direction and that the Y direction is the column direction, the gate wiring 117 extends in the row direction and the source wiring 118 extends in the column direction similarly to the first preferred embodiment, and the plurality of gate wirings 117 and the plurality of source wirings 118 are provided so as to intersect each other. Further, as a characteristic arrangement of the double scanning line system, the source wiring 118 is provided so as to divide the pixel electrodes 112 arranged in a matrix form into each two columns, and each source wiring 118 is connected to the pixel electrode 112 through the two TFTs 114 disposed on both sides of the source wiring 118. That is, in the source wirings 118, the inter-pixel region where one source wiring 118 is disposed and the inter-pixel region where the source wiring 118 is not disposed are alternately disposed in each region sandwiched between any two columns of pixel electrodes 112 adjacent to each other. The two gate wirings 117 are provided for each of the pixel electrodes 112 arranged in a matrix form so as to sandwich the pixel electrode 112 from both sides in the vertical direction, and the gate wiring 117 disposed sandwiching the TFTs 114 from both sides are alternately connected to the two TFTs 114 disposed on both sides of each source wiring 118. That is, two gate wirings 117 are provided in each region sandwiched between any two row of pixel electrodes 112 adjacent to each other.

The arrangement of each of the components provided on the side of the CF substrate 120 of the third preferred embodiment will be described in detail below with reference to FIGS. 11 and 12 while appropriately taking into account the positional relationship between the gate wiring 117 and the source wiring 118 provided on the side of the array substrate 110. Similarly to the first preferred embodiment, the BM 123 is provided in the CF substrate 120 of the third preferred embodiment. The BM 123 is constructed with the lattice-shaped light shielding pattern in which the BM opening 123o serving as the opening disposed corresponding to the pixel electrode 112 of each pixel is provided. As to the planar arrangement of the BM 123, as illustrated in the plan view of FIG. 11, the inter-pixel region where one source wiring 118 is disposed and the inter-pixel region where the source wiring 118 is not disposed are alternately repeated in the inter-pixel regions in the column direction between the pixel electrodes 112. However, the light shielding patterns of the BM 123 are disposed in both the inter-pixel region where one source wiring 118 is disposed and the inter-pixel region where the source wiring 118 is not disposed. Similarly to the first preferred embodiment, the light shielding patterns of the BM 123 disposed in both the inter-pixel region where one source wiring 118 is disposed and the inter-pixel region where the source wiring 118 is not disposed are provided with the same width. That is, the light shielding patterns provided along the column direction in the BM 123 are provided with the same width between the columns.

On the other hand, the two gate wirings 117 are provided in the inter-pixel region in the row direction between the pixel electrodes 112. In the inter-pixel region in the row direction between the pixel electrodes 112, as described above, the light shielding pattern of the BM 123 is disposed in the entire inter-pixel region in the row direction so as to cover the two gate wirings 117, which are provided adjacent and parallel to each other, including the gap between the two gate wirings 117 similarly to the first preferred embodiment.

In the transflective liquid crystal display device of the third preferred embodiment, a gap adjustment layer (hereinafter also referred to as a GC layer) 127 that adjusts the cell gap equivalent to the thickness of the liquid crystal layer 140 corresponding to an optical path of transmitted light and reflected light is provided in the transmission region T and the reflective region R of the CF substrate 120. The GC layer 127 is provided for adjusting such that the thickness of the liquid crystal layer 140 in the reflective region R becomes about a half of the thickness of the liquid crystal layer 140 in the transmission region T. As to a specific configuration, the GC layer 127 is constructed with a transparent resin layer having a predetermined film thickness equivalent to about a half of the thickness of the liquid crystal layer 140 in the transmission region T in the reflective region R on the CF substrate 120, and the transparent resin layer is opened, namely, removed in the transmission region T. When the GC layer 127 is provided, the thickness of the liquid crystal layer 140 in the reflective region R is adjusted thinner than the thickness of the liquid crystal layer 140 in the transmission region T by the thickness corresponding to the predetermined film thickness. That is, by setting the predetermined film thickness to about a half of the thickness of the liquid crystal layer 140 in the transmission region T, the thickness of the liquid crystal layer 140 in the reflective region R is adjusted to about a half of the thickness of the liquid crystal layer 140 in the transmission region T.

The GC layer 127 may be provided only in the reflective region R from the original purpose. However, as illustrated in the plan view of FIG. 11, the GC layer 127 is also provided in the region where the TFT 114 and the gate wiring 117 are formed. This is because of easiness of patterning processing of the transparent resin layer, and the GC layer 127 is basically formed over the entire surface of the display region 200 except for a stripe-shaped punched portion (opening) extending in the X direction corresponding to each transmission region T arranged in the X direction in the drawings.

In the transverse electric field system of the first preferred embodiment, the counter electrode 113 that generates an electric field driving the liquid crystal together with the pixel electrode 112 is provided on the side of the array substrate 110. In the third preferred embodiment, the counter electrode 113 provided on the side of the array substrate 110 is eliminated, and a common electrode 128 that generates an electric field driving the liquid crystal together with the pixel electrode 112 including the transmissive pixel electrode 112T and the reflective pixel electrode 112R is provided in the surface on the side of the liquid crystal layer 140 of the side the CF substrate 120. The antistatic transparent conductive layer 126, provided on the outside surface of the CF substrate 120, which is necessary for the transverse electric field system is also unnecessary.

As described above, the difference from the first preferred embodiment is mainly related to the fact that the transverse electric field system liquid crystal display device is changed to the transflective liquid crystal display device, and the columnar spacers (the main spacer 125m and the sub-spacer 125s) that are the main feature portion of the present invention will be described in detail below, but the columnar spacers are not largely different from those of the first preferred embodiment.

The configuration of the columnar spacer of the third preferred embodiment will be described in detail below. Similarly to the first preferred embodiment, the dual spacer structure is used in the columnar spacer (the main spacer 125m and the sub-spacer 125s) of the third preferred embodiment, and the main spacer 125m abuts on the array substrate 110 and the CF substrate 120 while the sub-spacer 125s abuts on the CF substrate 120 side but does not abut on the array substrate 110 as illustrated in the sectional view of FIG. 12 in the state in which the external pressure and the like are not applied.

As to the planar arrangement of the main spacer 125m and the sub-spacer 125s, the main spacer 125m and the sub-spacer 125s are disposed at the intersection of the lattice-shaped light shielding patterns provided between the BM openings 123o in the BM 123 as illustrated in the plan view of FIG. 11. In the third preferred embodiment, similarly to the first preferred embodiment, the inter-pixel region where one source wiring 118 is disposed and the inter-pixel region where the source wiring 118 is not disposed are alternately disposed in each region sandwiched between any two columns of pixel electrodes 112 adjacent to each other, so that a portion in which the gate wirings 117 and the source wirings 118 intersect each other and a portion in which the gate wirings 117 and the source wirings 118 do not intersect each other, namely, a portion in which only the gate wiring 117 is provided are basically alternately provided along the row direction at the intersection of the lattice-shaped light shielding patterns in the BM 123.

Thus, at the intersection of the lattice-shaped light shielding patterns in the BM 123, a step due to the difference in the presence or absence of the source wiring 118 is formed on the array substrate 110. As long as a planarization layer that planarizes the step is provided above the source wiring 118, the steps having different heights on the surface of the array substrate 110 are provided in the portion in which the gate wiring 117 and the source wiring 118 intersect each other and the portion in which the gate wiring 117 and the source wiring 118 do not intersect each other at the intersection of the lattice-shaped light shielding pattern in the BM 123.

Because the two gate wirings 117 are provided in the inter-pixel region in the row direction, the main spacer 125m and the sub-spacer 125s may be disposed at the intersection of the lattice-shaped light shielding pattern in the BM 123 while overlapping in any one of the two gate wirings 117 provided adjacent and parallel to each other, or the main spacer 125m and the sub-spacer 125s may be disposed while overlapping both of the two gate wirings 117. However, the generation of the drag trace is concerned on the downstream side in the alignment processing direction of the columnar spacer, so the following arrangement is desirably selected. That is, in the third preferred embodiment, although the alignment processing direction is not clearly illustrated in the plan view of FIG. 11, the main spacer 125m and the sub-spacer 125s are disposed at the intersections of the lattice-shaped light shielding patterns in the BM 123 on the gate line 117 located on the upstream side of the alignment processing direction in the two gate wirings 117 provided adjacent and parallel to each other, and the light of the drag trace generated on the downstream side in the alignment processing direction of the main spacer 125m and the sub-spacer 125s is effectively shielded by the BM 123 disposed so as to cover the two gate wirings 117, which are provided adjacent and parallel to each other, including the gap between the two gate wirings 117.

In the main spacer 125m and the sub-spacer 125s of the third preferred embodiment, similarly to the first preferred embodiment, the columnar resin pattern that is fixedly attached to the surface of the CF substrate 120 while provided with the same thickness is formed as a common member.

In particular, in the transflective liquid crystal display device, an organic resin film is frequently provided on the side of the array substrate 110 to form irregularities in order to scatter the light by the reflective pixel electrode 112R to improve the visibility of the reflected image. In this case, the step due to the presence or absence of the source wiring 118 is planarized, but the dual spacer structure of the present invention cannot be constructed. On the other hand, in the transflective liquid crystal display device of the third preferred embodiment, the organic resin film (organic planarization film) having the function of planarizing the substrate surface is not provided on the side of the array substrate 110, but as illustrated in the sectional view of FIG. 12, on the surface of the array substrate 110 disposed opposite the main spacer 125m and the sub-spacer 125s, the step due to the difference in presence or absence of the source wiring 118 is formed similarly to the first preferred embodiment to effectively function to construct the main spacer 125m and the sub-spacer 125s.

As described above, the main spacer 125m and the sub-spacer 125s of the third preferred embodiment effectively function as the columnar spacer having the dual spacer structure because of the relation between the characteristic arrangement of the gate wiring 117 and the source wiring 118 of the third preferred embodiment and the planar arrangement of the main spacer 125m and the sub-spacer 125s.

In the third preferred embodiment, the GC layer 127 is provided on the CF substrate 120, and the GC layer 127 is also provided in the region where the gate wiring 117 is formed as described above. Consequently, the main spacer 125m and the sub-spacer 125s, which are disposed in the portion in which the interconnection 117 and the source interconnection 118 intersect each other and the portion in which the gate wiring 117 and the source wiring 118 do not intersect each other, namely, the portion in which only the gate wiring 117 is provided, are disposed on the surface of the GC layer 127 as illustrated in the sectional view of FIG. 12.

The action and effects of the liquid crystal display device of the third preferred embodiment will be described below. Because the liquid crystal display device of the third preferred embodiment is the transflective liquid crystal display device, the alignment processing is performed in a direction inclined at a predetermined angle with respect to the column direction that is the extending direction of the source wiring 118. Thus, for the main spacer 125*m* and the sub-spacer 125*s* disposed at the intersection of the lattice-shaped light shielding pattern of the third preferred embodiment, although the drag trace that is generated on the downstream side in the alignment processing direction of the columnar spacer as described in the first preferred embodiment is formed along the direction inclined at a predetermined angle with respect to the extending direction of the source wiring 118 that is located on the downstream side from the intersection of the light shielding pattern in which these columnar spacers are disposed, the light shielding region having a relatively wide area is formed near the intersection of the light shielding regions in which the main spacer 125*m* and the sub-spacer 125*s* are disposed, so that the light leakage is hardly generated in the drag trace portion.

In particular, in the third preferred embodiment, as described above, the main spacer 125*m* and the sub-spacer 125*s* are disposed at the intersection of the lattice-shaped light shielding patterns in the BM 123 on the gate wiring 117 located on the upstream side in the alignment processing direction between the two gate wirings 117 provided adjacent and parallel to each other in the inter-pixel region in the row direction. Thus, the light of the drag trace generated on the downstream side in the alignment processing direction of the main spacer 125*m* and the sub-spacer 125*s* is effectively shielded by the BM 123 disposed so as to cover the two gate wirings 117, which are provided adjacent and parallel to each other, including the gaps between the two gate wirings 117. In the lattice-shaped light shielding pattern of the BM 123 of the third preferred embodiment, the light shielding pattern is disposed in not only the inter-pixel region where the source wiring 118 is disposed, but also the inter-pixel region where the source wiring 118 is not disposed. Consequently, the light can effectively be shielded for the drag trace generated near the sub-spacer 125*s*, and the light leakage is hardly generated.

That is, the arrangement of the main spacer 125*m* and the sub-spacer 125*s* and the arrangement of the lattice-shaped light shielding patterns in the BM 123 are adopted in the third preferred embodiment. Consequently, the light leakage due to the drag trace and degradation of contrast of the display image associated with the light leakage in the vicinities of the main spacer 125*m* and the sub-spacer 125*s*, namely, the degradation of the display quality can be prevented. The light leakage can be prevented without increasing the light shielding region in the BM 123 more than necessary, namely, without lowering the aperture ratio more than necessary, or the degradation of the display quality associated with the light leakage can be prevented.

As described above, in the third preferred embodiment, similarly to the first preferred embodiment, since the dual spacer structure is formed using the step formed on the surface of the array substrate 110, the main spacer 125*m* and the sub-spacer 125*s* can be formed on the side of the CF substrate 120 with the columnar resin pattern having the same thickness as the common member. As a result, the use of the manufacturing process that may be accompanied by the complication of the process or the cost increase is eliminated, so that the generation of the defect when the liquid crystal display device is placed at low temperatures or high temperatures can be prevented relatively easily or at low cost, and the liquid crystal display device having the dual spacer structure which can obtain high reliability even if used in a wide temperature range can be obtained.

As described above, in the third preferred embodiment, the main spacer 125*m* and the sub-spacer 125*s* are disposed on the surface of the GC layer 127 because of the transflective liquid crystal display device, the thickness of the liquid crystal layer 140 is thinned in the region where the GC layer 127 is formed, and the thickness of the columnar resin pattern constituting the main spacer 125*m* and the sub-spacer 125*s* is also thinned, the thickness of the columnar resin pattern being equivalent to the thickness of the liquid crystal layer 140. This is not limited to the case of the third preferred embodiment, but is the feature common to the use of the transflective liquid crystal display device in which the GC layer 127 that adjusts the cell gap is provided on the side of the CF substrate 120. In the case where the GC layer 127 that adjusts the cell gap is provided on the side of the CF substrate 120, when the dual spacer structure is attempt to be constructed with the columnar resin pattern that is provided with different thicknesses between the main spacer and the sub-spacer, it is necessary to use a processing process, such as a halftone mask, which is a known method for providing a difference in thickness to form the dual spacer structure in the relatively-thin columnar resin pattern. The thickness of the relatively-thin columnar resin pattern serving as the sub-spacer is decided as a result of these processing processes. However, the columnar resin pattern serving as the sub-spacer is sometimes too thin, and the thickness and shape of the columnar resin pattern serving as the sub-spacer become unstable. That is, in the configuration of the transflective liquid crystal display device in which the GC layer 127 that adjusts the cell gap is provided on the side of the CF substrate 120, there is a problem in that the dual spacer structure cannot stably be formed.

However, in the third preferred embodiment, on the side of the CF substrate 120, the columnar resin patterns provided with the same thickness are used as the member common to the main spacer 125*m* and the sub-spacer 125*s*, and the dual spacer structure is formed using the step formed on the surface of the array substrate 110. Consequently, even if the columnar resin pattern provided with the same thickness on the side of the CF substrate 120 is relatively thin, it is not necessary to use the processing process of providing the step. Therefore, the main spacer 125*m* and the sub-spacer 125*s* can be formed using the columnar resin pattern having a relatively stable thickness. Thus, in the third preferred embodiment, the dual spacer structure can stably be formed despite the semi-transmissive liquid crystal display device in which the GC layer 127 that adjusts the cell gap is provided on the side of the CF substrate 120.

In the description of the first to third preferred embodiments and the modification thereof, in order to form the dual spacer structure in the columnar spacer disposed at the intersection of the lattice-shaped light shielding patterns in the BM 123, by way of example, the gate wiring 117 and the source wiring 118 of the double scanning line system are selected as the arrangement of the gate wiring 117 and the source wiring 118 which become the means for forming the step provided on the surface of the array substrate 110, or like the second preferred embodiment, the two source wirings 118 are disposed between two rows of pixel electrodes 112 adjacent to each other and the arrangement of the gate wiring 117 and the source wiring 118 is selected, in which the inter-pixel region where one gate wiring 117 is disposed and the inter-pixel region where gate wiring 117 is not disposed are alternately repeated in the region between two columns of pixel electrodes 112 adjacent each other. However, the configuration suitable for the present invention is not limited to the these examples For example, with respect to the arrangement of the gate wiring 117 and the source wiring 118, one of the plurality of gate wirings 117 and the plurality of source wirings 118 are disposed in the region between any two rows of pixel electrodes 112 adjacent to each other, and the region where one signal line of the other of the plurality of gate wirings 117 and the plurality of source wirings 118 is disposed and the region where one signal line of the other of the plurality of gate wirings 117 and the plurality of source wirings 118 is not disposed are mixed in the region between any two columns of pixel electrodes 112 adjacent to each other. In this case, the step due to the presence or absence of one of the gate wiring 117 and the source wiring 118 can be provided at the intersection of the lattice-shaped light shielding patterns in the BM 123 similarly to the arrangement of the gate wiring 117 and the source wiring 118 of the first to third preferred embodiments. Thus, using the step formed at the intersection of the lattice-shaped light shielding patterns in the BM 123, the dual spacer structure can be formed in the columnar spacer disposed at the intersection similarly to the first to third preferred embodiments. That is, as described above, the basic effects of the present invention described in the first to third preferred embodiments can be obtained.

In addition to the basic effects obtained by the present invention in the case where the present invention is applied to the transverse electric field system liquid crystal display device, or in particular, the transflective liquid crystal display device in which the organic resin film (organic planarizing film) is not provided on the side of the array substrate 110, an additional effect can be obtained in the first to third preferred embodiments and the modifications thereof, so that the first to third preferred embodiments and the modifications thereof as a more preferable application example have been described. However, the configuration suitable for the present invention is not limited to these examples. That is, the present invention may be applied to, for example, a liquid crystal display device of twisted nematic (TN) type or other type. As long as the step due to the presence or absence of one of the gate wiring 117 and the source wiring 118 can be provided at the intersection of the lattice-shaped light shielding patterns in the BM 123 similarly to the arrangement of the gate wiring 117 and the source wiring 118 in the first to third preferred embodiments, the dual spacer structure can be formed in the columnar spacer disposed at the intersection using the step. That is, as described above, the basic effects of the present invention described in the first to third preferred embodiments can be obtained.

The present invention is not limited to the first to third preferred embodiments and the modifications thereof or the configurations suggesting the modifications, but a part of the configuration described in the preferred embodiments may be replaced with the well-known configuration without departing from the scope of the present invention. The first to third preferred embodiments and the modifications thereof or configurations suggesting the modifications can be applied in combination with each other within a range where inconsistency is not generated, and each effect and composite effect generated by each configuration can be obtained.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display device comprising:
an array substrate on which a plurality of pixel electrodes, a switching element, a plurality of scanning signal lines, and a plurality of video signal lines are provided, the plurality of pixel electrodes being arranged in a matrix form in a display region where an image is displayed, the switching element being connected to each of the pixel electrodes, the plurality of scanning signal lines and the plurality of video signal lines extending in a row direction or a column direction while intersecting each other, the plurality of scanning signal lines and the plurality of video signal lines being connected to the switching element; and
a counter substrate that is provided opposite the array substrate with an interval while a liquid crystal layer is interposed between the counter substrate and the array substrate, and includes a black matrix that is constructed with a light shielding pattern formed into a lattice shape while overlapping a region between the pixel electrodes arranged in the matrix form and a plurality of columnar spacers that hold the interval between the counter substrate and the array substrate within a fixed range, wherein
either one of the plurality of scanning signal lines and the plurality of video signal lines are disposed on the array substrate in a region between any two rows of pixel electrodes adjacent to each other, a region where one signal line of the other of the plurality of scanning signal lines and the plurality of video signal lines is disposed and a region where one signal line of the other of the plurality of scanning signal lines and the plurality of video signal lines is not disposed are disposed in a mixed manner in a region between any two columns of pixel electrodes adjacent to each other,
an intersection of the light shielding pattern formed into the lattice shape includes a portion in which the scanning signal line and the video signal line intersect each other and a portion in which the scanning signal line and the video signal line do not intersect each other, a step having a difference in height of a surface of the array substrate is provided between the portion in which the scanning signal line and the video signal line intersect each other and the portion in which the scanning signal line and the video signal line do not intersect each other,
the columnar spacer includes a main spacer and a sub-spacer,
the main spacer being provided at the intersection of the light shielding pattern formed into the lattice shape while provided in the portion in which the scanning signal line and the video signal line intersect with each other, the main spacer abutting on the surface of the array substrate,
the sub-spacer being provided entirely within the portion in which the scanning signal line and the video signal line do not intersect each other, the sub-spacer not abutting on the surface of the array substrate in a normal time, the sub-spacer abutting on the surface of the array substrate when the interval is narrowed within the fixed range.

2. The liquid crystal display device according to claim 1, wherein in the black matrix constructed with the light shielding pattern formed into the lattice shape, the light shielding pattern that is provided along the column direction is provided with an identical width between columns.

3. The liquid crystal display device according to claim 1, comprising a counter electrode that drives a liquid crystal in the liquid crystal layer by generating an electric field between the counter electrode and the pixel electrode provided on the array substrate, wherein
at least one of the pixel electrode and the counter electrode includes a slit electrode or a comb-tooth electrode while a longitudinal direction of the slit electrode or the comb-tooth electrode is set to the column direction.

4. The liquid crystal display device according to claim 1, comprising a counter electrode that drives a liquid crystal in the liquid crystal layer by generating an electric field between the counter electrode and the pixel electrode provided on the array substrate, wherein
at least one of the pixel electrode and the counter electrode includes a bent-shaped slit electrode or a bent-shaped comb-tooth electrode having two longitudinal directions which are positively or negatively inclined at an identical angle of 30 degrees or less with respect to the column direction.

5. The liquid crystal display device according to claim 1, wherein
the main spacer and the sub-spacer are fixedly attached to a surface of the counter substrate, and constructed with resin patterns having an identical thickness.

6. The liquid crystal display device according to claim 5, wherein
the liquid crystal display device is a transflective liquid crystal display device in which the pixel electrode includes a transmissive electrode that forms a transmissive region partially transmitting light and a reflective electrode that forms a reflective region partially reflecting light,
a gap adjustment layer is provided on the counter substrate while provided with a predetermined film thickness in at least the reflective region and opened in the transmissive region, the gap adjustment layer adjusting a thickness of the liquid crystal layer in the reflective region such that the thickness of the liquid crystal layer in the reflective region is thinner than a thickness of the liquid crystal layer in the transmissive region by the predetermined film thickness, and the main spacer and the sub-spacer are disposed on a surface of the gap adjustment layer.

7. The liquid crystal display device according to claim 1, wherein
the liquid crystal display device is a liquid crystal display device of a double scanning line system in which two scanning signal lines are disposed on the array substrate in the region between any two rows of pixel electrodes adjacent to each other, and a region where one video signal line is disposed and a region where the video signal line is not disposed are alternately disposed for each column on the array substrate in the region between any two columns of pixel electrodes adjacent to each other.

8. The liquid crystal display device according to claim 1, wherein
two video signal lines are disposed on the array substrate in the region between any two rows of pixel electrodes adjacent to each other, a region where one scanning signal line is disposed and a region where the scanning signal line is not disposed are alternately disposed for each column on the array substrate in the region between any two columns of pixel electrodes adjacent to each other, and
in pixels corresponding to the plurality of pixel electrodes arrayed in the matrix form, picture elements in each of which four pixels are set as repetitive units are arrayed to perform color display, the four pixels including four colors of blue, red, green, and white which are arranged in a matrix of two rows and two columns.

9. A liquid crystal display device comprising:
an array substrate on which a plurality of pixel electrodes, a switching element, a plurality of scanning signal lines, and a plurality of video signal lines are provided, the plurality of pixel electrodes being arranged in a matrix form in a display region where an image is displayed, the switching element being connected to each of the pixel electrodes, the plurality of scanning signal lines and the plurality of video signal lines extending in a row direction or a column direction while intersecting each other, the plurality of scanning signal lines and the plurality of video signal lines being connected to the switching element; and
a counter substrate that is provided opposite the array substrate with an interval while a liquid crystal layer is interposed between the counter substrate and the array substrate, and includes a black matrix that is constructed with a light shielding pattern formed into a lattice shape while overlapping a region between the pixel electrodes arranged in the matrix form and a plurality of columnar spacers that hold the interval between the counter substrate and the array substrate within a fixed range, wherein
either one of the plurality of scanning signal lines and the plurality of video signal lines are disposed on the array substrate in a region between any two rows of pixel electrodes adjacent to each other, a region where one signal line of the other of the plurality of scanning signal lines and the plurality of video signal lines is disposed and a region where one signal line of the other of the plurality of scanning signal lines and the plurality of video signal lines is not disposed are disposed in a mixed manner in a region between any two columns of pixel electrodes adjacent to each other,
an intersection of the light shielding pattern formed into the lattice shape includes a portion in which the scanning signal line and the video signal line intersect each other and a portion in which the scanning signal line and the video signal line do not intersect each other, a step having a difference in height of a surface of the array substrate is provided between the portion in which the scanning signal line and the video signal line intersect each other and the portion in which the scanning signal line and the video signal line do not intersect each other,
the columnar spacer includes a main spacer and a sub-spacer,
the main spacer being provided at the intersection of the light shielding pattern formed into the lattice shape while provided in the portion in which the scanning signal line and the video signal line intersect with each other, the main spacer abutting on the surface of the array substrate,
the sub-spacer being provided at the portion in which the scanning signal line and the video signal line do not intersect each other, the sub-spacer not abutting on the surface of the array substrate in a normal time, the sub-spacer abutting on the surface of the array substrate when the interval is narrowed within the fixed range, and in the black matrix constructed with the light shielding pattern formed into the lattice shape, the light shielding pattern that is provided along the column direction overlapping the region where one signal line of the other of the plurality of scanning signal lines and the plurality of video signal lines is not disposed is narrower than the light shielding pattern that is disposed in the column direction while overlapping the region where one signal line of the other of the plurality of scanning signal lines and the plurality of video signal lines is disposed.

10. A liquid crystal display device comprising:

an array substrate on which a plurality of pixel electrodes, a switching element, a plurality of scanning signal lines, and a plurality of video signal lines are provided, the plurality of pixel electrodes being arranged in a matrix form in a display region where an image is displayed, the switching element being connected to each of the pixel electrodes, the plurality of scanning signal lines and the plurality of video signal lines extending in a row direction or a column direction while intersecting each other, the plurality of scanning signal lines and the plurality of video signal lines being connected to the switching element; and a counter substrate that is provided opposite the array substrate with an interval while a liquid crystal layer is interposed between the counter substrate and the array substrate, and includes a black matrix that is constructed with a light shielding pattern formed into a lattice shape while overlapping a region between the pixel electrodes arranged in the matrix form and a plurality of columnar spacers that hold the interval between the counter substrate and the array substrate within a fixed range, wherein either one of the plurality of scanning signal lines and the plurality of video signal lines are disposed on the array substrate in a region between any two rows of pixel electrodes adjacent to each other, a region where one signal line of the other of the plurality of scanning signal lines and the plurality of video signal lines is disposed and a region where one signal line of the other of the plurality of scanning signal lines and the plurality of video signal lines is not disposed are disposed in a mixed manner in a region between any two columns of pixel electrodes adjacent to each other, an intersection of the light shielding pattern formed into the lattice shape includes a portion in which the scanning signal line and the video signal line intersect each other and a portion in which the scanning signal line and the video signal line do not intersect each other, a step having a difference in height of a surface of the array substrate is provided between the portion in which the scanning signal line and the video signal line intersect each other and the portion in which the scanning signal line and the video signal line do not intersect each other, the columnar spacer includes a main spacer and a sub-spacer, the main spacer being provided at the intersection of the light shielding pattern formed into the lattice shape while provided in the portion in which the scanning signal line and the video signal line intersect with each other, the main spacer abutting on the surface of the array substrate, the sub-spacer being provided at the portion in which the scanning signal line and the video signal line do not intersect each other, the sub-spacer not abutting on the surface of the array substrate in a normal time, the sub-spacer abutting on the surface of the array substrate when the interval is narrowed within the fixed range, and the main spacer and the sub-spacer are fixedly attached to a surface of the counter substrate, and constructed with resin patterns having different thicknesses, and the resin pattern constituting the sub-spacer is thinner than the resin pattern constituting the main spacer.

* * * * *